US012572456B2

(12) United States Patent
Kim et al.

(10) Patent No.:    US 12,572,456 B2
(45) Date of Patent:        Mar. 10, 2026

(54) MEMORY MODULE INCLUDING MEMORY DEVICES TO WHICH UNIT ID IS ASSIGNED AND STORAGE DEVICE INCLUDING THE SAME

(71) Applicant: SAMSUNG ELECTRONICS CO., LTD., Suwon-si (KR)

(72) Inventors: Ki-Heung Kim, Suwon-si (KR); Taeyoung Oh, Suwon-si (KR); Taekwoon Kim, Suwon-si (KR); Jinseong Yun, Suwon-si (KR); Yoonjae Jeong, Suwon-si (KR); Hyongryol Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/634,559

(22) Filed: Apr. 12, 2024

(65) Prior Publication Data

US 2024/0345944 A1     Oct. 17, 2024

(30) Foreign Application Priority Data

Apr. 13, 2023    (KR) ........................ 10-2023-0048926
Jul. 25, 2023    (KR) ........................ 10-2023-0096872

(51) Int. Cl.
*G06F 12/00*        (2006.01)
*G06F 12/02*        (2006.01)

(52) U.S. Cl.
CPC .... *G06F 12/0223* (2013.01); *G06F 2212/202* (2013.01)

(58) Field of Classification Search
CPC . G06F 12/0223; G06F 2212/202; G11C 5/04; G11C 8/12; G11C 7/10; G11C 7/20; G11C 7/1045
See application file for complete search history.

(56) References Cited

U.S. PATENT DOCUMENTS

| | | | |
|---|---|---|---|
| 5,928,343 A * | 7/1999 | Farmwald .............. | G11C 5/066 |
| | | | 711/E12.089 |
| 8,612,774 B2 | 12/2013 | Dellow | |
| 10,521,618 B1 | 12/2019 | Zhang et al. | |
| 10,713,137 B2 | 7/2020 | Kim et al. | |
| 10,891,243 B2 | 1/2021 | Morris et al. | |
| 2009/0045867 A1* | 2/2009 | Kwong .................. | G11C 17/16 |
| | | | 327/525 |

(Continued)

FOREIGN PATENT DOCUMENTS

JP        2006-338773 A    12/2006

OTHER PUBLICATIONS

Communication dated Oct. 7, 2024, issued by European Patent Center in European Patent Application No. 24169913.1.

*Primary Examiner* — Shawn X Gu
*Assistant Examiner* — Mohammad S Hasan
(74) *Attorney, Agent, or Firm* — Sughrue Mion, PLLC

(57)        ABSTRACT
A method of operating a memory configured to communicate with a memory controller, the method includes: temporarily storing a unique identification (ID) for each of a plurality of memory devices included in the memory to each of the plurality of memory devices; selecting a target memory device from among the plurality of memory devices; and permanently or substantially permanently programming, in the target memory device, a unique ID corresponding to the target memory device.

18 Claims, 26 Drawing Sheets

(56) References Cited

U.S. PATENT DOCUMENTS

| | | | |
|---|---|---|---|
| 2009/0198857 A1* | 8/2009 | Pyeon | G11C 8/12 |
| | | | 711/E12.001 |
| 2015/0095601 A1* | 4/2015 | Muralimanhar | G06F 12/0223 |
| | | | 711/163 |
| 2017/0125119 A1* | 5/2017 | Loh | G11C 29/1201 |
| 2020/0226045 A1* | 7/2020 | Le | G06F 1/30 |
| 2021/0012831 A1* | 1/2021 | Oh | G11C 11/4076 |
| 2021/0141747 A1* | 5/2021 | Jeong | G11C 7/222 |
| 2022/0276958 A1 | 9/2022 | Sethuraman et al. | |
| 2023/0072674 A1* | 3/2023 | Vogelsang | G11C 5/04 |
| 2023/0205430 A1* | 6/2023 | Boehm | G06F 3/0619 |
| | | | 711/103 |
| 2023/0289301 A1* | 9/2023 | Meier | G11C 11/4074 |

* cited by examiner

Target Fuse Cell 2

Target Fuse Cell 1

| ID4 | ID3 | ID2 | ID1 | ID0 |
| 1 | 0 | 0 | 0 | 1 |

FIG. 18

| Safety keys | OP[7] | OP[6] | OP[5] | OP[4] | OP[3] | OP[2] | OP[1] | OP[0] |
|---|---|---|---|---|---|---|---|---|
| TMRS_SFT 1 | 1 | 1 | 0 | 0 | 1 | 1 | 1 | 1 |
| TMRS_SFT 2 | 0 | 1 | 1 | 1 | 0 | 0 | 1 | 1 |
| TMRS_SFT 3 | 1 | 0 | 1 | 1 | 1 | 0 | 1 | 1 |
| TMRS_SFT 4 | 0 | 0 | 1 | 1 | 1 | 0 | 1 | 1 |

[Safety key encoding]

FIG. 19A

| | CS_n | CA0 | CA1 | CA2 | CA3 | CA4 | CA5 | CA6 |
|---|---|---|---|---|---|---|---|---|
| MRW | L | V | V | V | V | V | V | V |
| | H | OP0 | OP1 | OP2 | OP3 | OP4 | OP5 | OP6 |
| | CS_n | CA7 | CA8 | CA9 | CA10 | CA11 | CA12 | CA13 |
| MRW | L | V | V | V | V | V | V | V |
| | H | OP7 | V | V | V | V | V | V |

[Address of Target Fuse Cell]

FIG. 19B

| | | MRW1 | MRW2 | MRW3 |
|---|---|---|---|---|
| CA0 | OP0 | | | |
| CA1 | OP1 | | | |
| CA2 | OP2 | | | |
| CA3 | OP3 | Row Address | Column Address | Bank Address |
| CA4 | OP4 | | | |
| CA5 | OP5 | | | |
| CA6 | OP6 | | | |
| CA7 | OP7 | | | |

Memory Deivce

2100 — ID Storage Region

2200 — Register 1

2300 — Register 2

2400

2500

531 or 532

MEMORY MODULE INCLUDING MEMORY DEVICES TO WHICH UNIT ID IS ASSIGNED AND STORAGE DEVICE INCLUDING THE SAME

CROSS-REFERENCE TO RELATED APPLICATIONS

This application is based on and claims priority under 35 U.S.C. § 119 to Korean Patent Application Nos. 10-2023-0048926, filed on Apr. 13, 2023 and 10-2023-0096872, filed on Jul. 25, 2023, in the Korean Intellectual Property Office, the disclosures of which are herein incorporated by reference in their entirety.

BACKGROUND

The disclosure relates to a memory and a storage device including the same memory.

Memory devices are used to store data and are classified into volatile memory devices and nonvolatile memory devices. A flash memory device, a type of nonvolatile memory device, may be used in mobile phones, digital cameras, portable computer devices, stationary computer devices, or other devices.

A memory is implemented to include a plurality of memory devices. In general, identifications (IDs) of a plurality of memory devices on the memory are assigned in a soft setting manner. For example, the IDs of the plurality of memory devices on the memory are set when power is turned on. However, based on the soft setting manner, the IDs of the plurality of memory devices on the memory need to be newly assigned each time the power is turned on.

SUMMARY

Provided is a storage device that is capable of permanently storing a unit ID of each of a plurality of memory devices included in a memory.

According to an aspect of the disclosure, a method of operating a memory configured to communicate with a memory controller, the method includes: temporarily storing a unique identification (ID) for each of a plurality of memory devices included in the memory to each of the plurality of memory devices: selecting a target memory device from among the plurality of memory devices: and permanently or substantially permanently programming, in the target memory device, a unique ID corresponding to the target memory device.

According to an aspect of the disclosure, a memory configured to communicate a memory controller, the memory comprising a plurality of memory devices, wherein each of the plurality of memory devices includes: a memory cell array comprising a plurality of memory cells: a command decoder configured to decode a command received from the memory controller: a mode register configured to temporarily store information on a unique identification (ID) received from the memory controller: and an ID storage region configured to store the information on the unique ID, wherein a unique ID for each of the plurality of memory devices is stored in a mode register of each of the plurality of memory devices through a per-DRAM addressability (PDA) mode, and wherein a unique ID for a target memory device, among the plurality of memory devices, is programmed in an ID storage region of the target memory device through an one-time programmable (OTP) mode.

According to an aspect of the disclosure, a storage device includes: a memory; a memory controller configured to control an operation of the memory and configured to communicate with the memory through a first bus; and a baseboard management controller configured to communicate with the memory through a second bus and configured to monitor information on the memory, wherein the memory comprises a plurality of memory devices, wherein each of the plurality of memory devices comprises: a memory cell array comprising a plurality of memory cells: a command decoder configured to decode a command received from the memory controller: a mode register configured to temporarily store information on a unique ID received from the memory controller; and an ID storage region configured to store the information on the unique ID, and wherein a unique ID for each of the plurality of memory devices is stored in a mode register of each of the plurality of memory devices through a per-DRAM addressability (PDA) mode, and wherein a unique ID for a target memory device, among the plurality of memory devices, is programmed in an ID storage region of the target memory device through an one-time programmable (OTP) mode.

BRIEF DESCRIPTION OF THE DRAWINGS

The above and other aspects, features, and advantages of the present disclosure will be more clearly understood from the following detailed description, taken in conjunction with the accompanying drawings:

FIG. 2 is a block diagram illustrating an example of a memory device according to an example embodiment:

FIGS. 11 to 13 are diagrams illustrating an example of a memory according to an example embodiment:

FIGS. 17, 18, 19A, and 19B are diagrams illustrating a program operation on a target fuse cell according to an example embodiment:

FIG. 20 is a schematic diagram illustrating an example of an OTP program recognition operation according to an example embodiment:

FIG. 21 is a schematic diagram illustrating an example of a memory device according to an example embodiment.

DETAILED DESCRIPTION

Figure 1A:
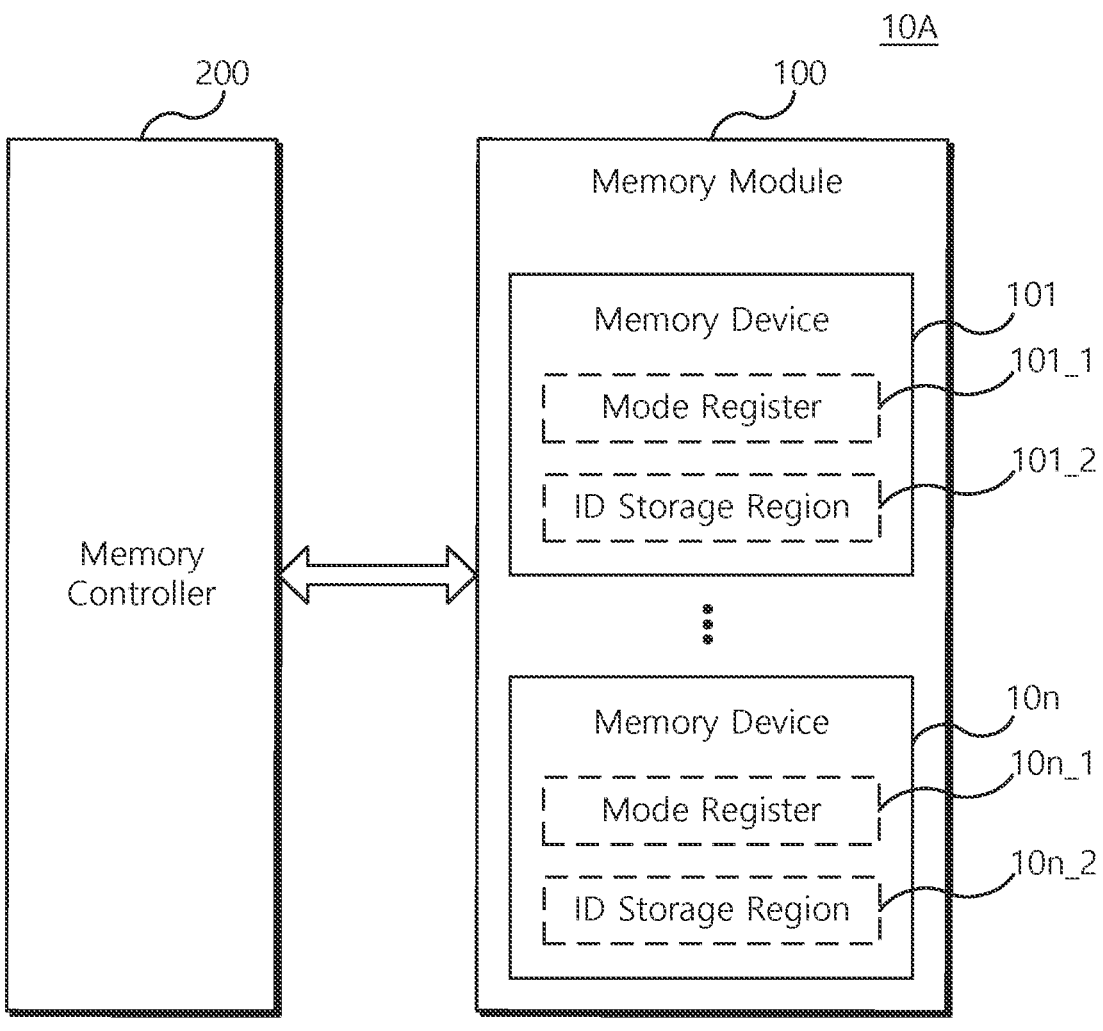
FIGS. 1A to 1D are block diagrams illustrating a storage device according to an example embodiment.

The description merely illustrates the principles of the disclosure. Those skilled in the art will be able to devise one or more arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Terms used in the disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the disclosure cannot be interpreted to exclude embodiments of the present disclosure.

In one or more embodiments of the disclosure described below, a hardware approach is described as an example. However, since the one or more embodiments of the disclosure include technology that uses both hardware and software, the various embodiments of the present disclosure do not exclude a software-based approach.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to.'

The term "controller" refers to any device, system, or part thereof that controls at least one operation. The functionality associated with any particular controller may be centralized or distributed, whether locally or remotely. The term "memory module" may refers to any device, system, or part thereof that stores data. In one embodiment, the term "memory module" may be referred to as "memory". The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Figure 1B:
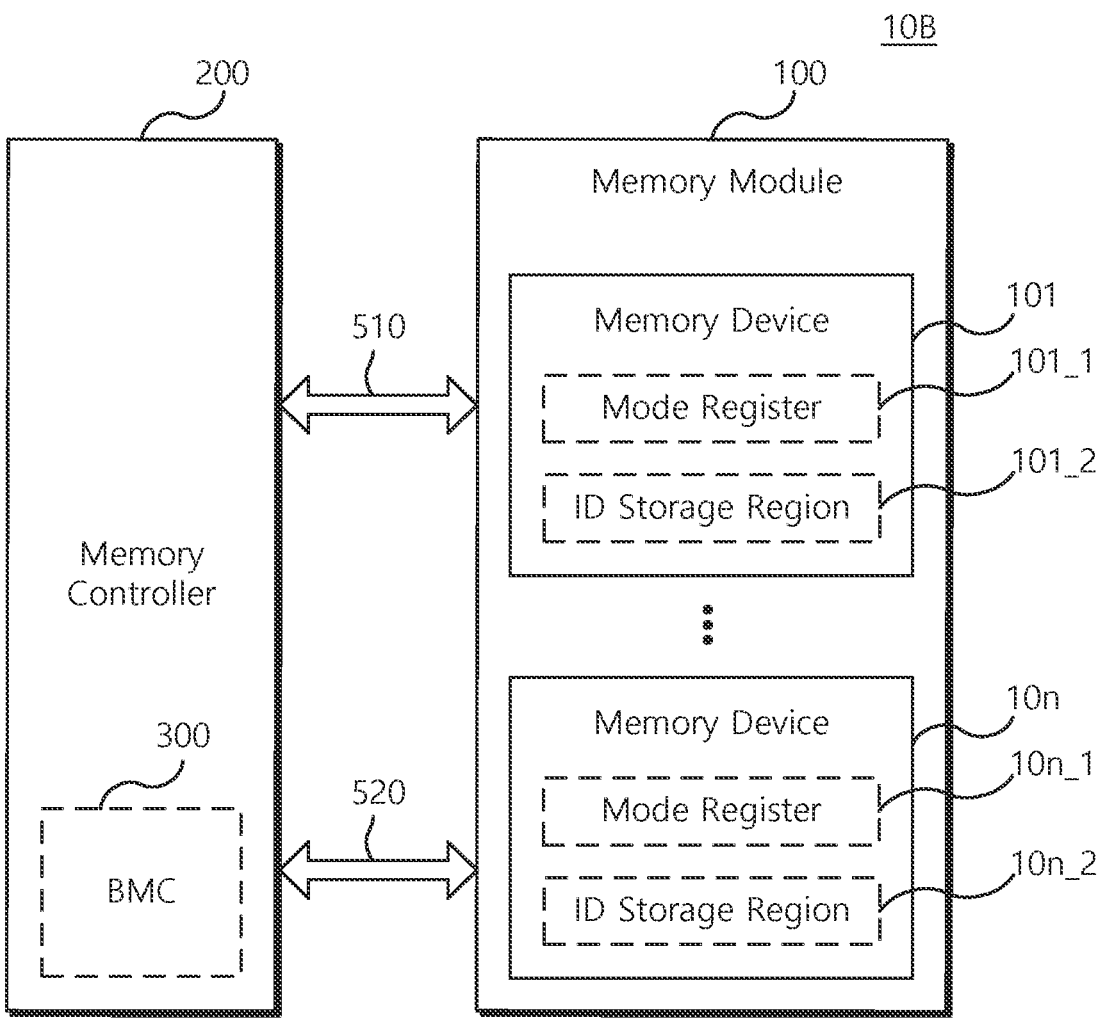
Figure 1C:
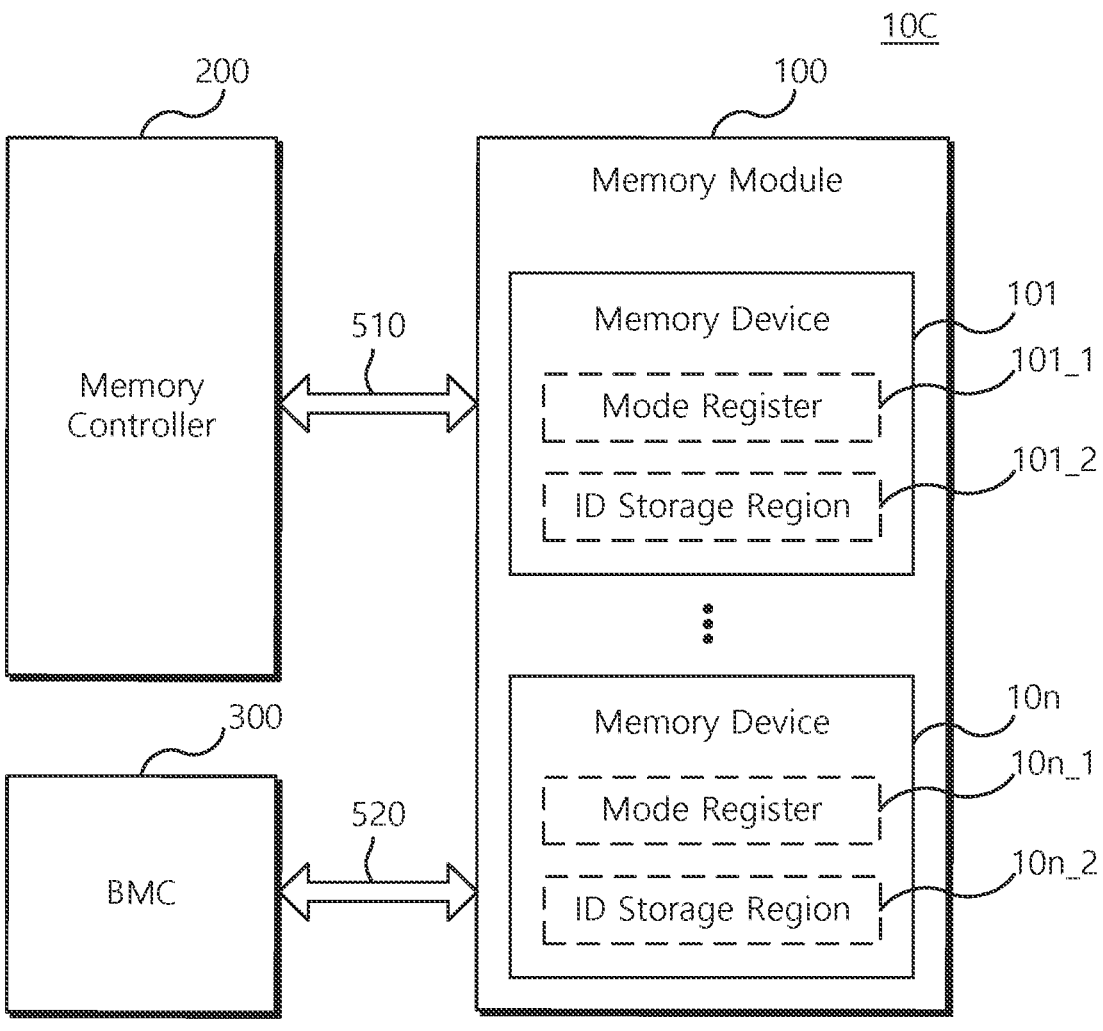
Figure 1D:
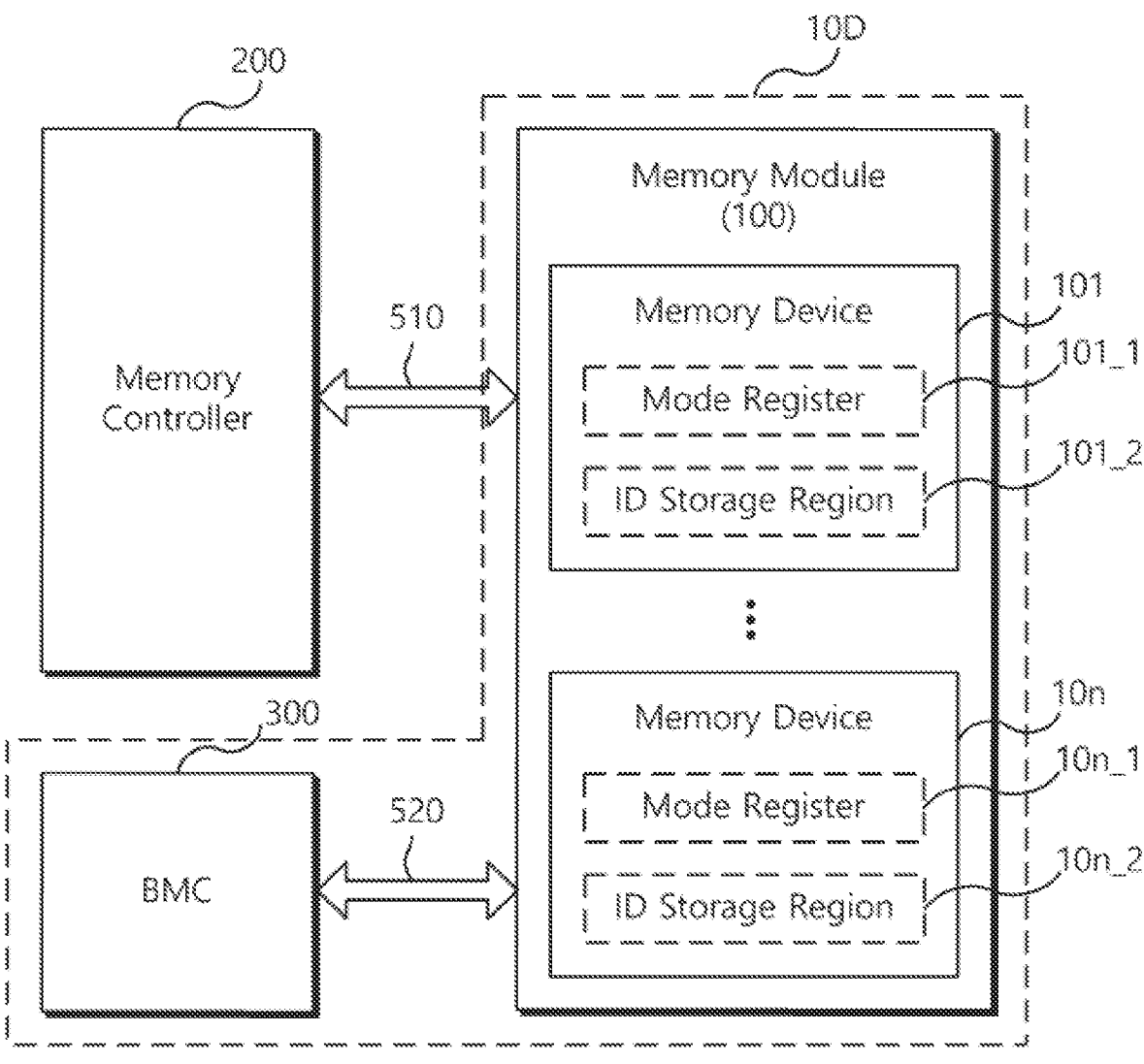

FIGS. 1A to 1D are block diagrams illustrating a storage device according to an example embodiment. FIG. 1A illustrates a storage device 10A, temporarily storing a unique ID, according to an example embodiment. FIGS. 1B and IC illustrate storage devices 10B and 10C, additionally supporting sideband communication, according to an example embodiment. FIG. 1D illustrates an example of the case in which a memory controller is disposed outside a storage device 10D.

Each of the storage devices 10A, 10B, 10C and 10D may include a memory module 100 and a memory controller 200. The memory controller 200 may set (or assign) the unique identification (ID) for each of a plurality of memory devices 101 to 10n included in the memory module 100. The memory module 100 may temporarily store a unique ID corresponding to each of the plurality of memory devices 101 to 10n in a mode register of a corresponding memory device. The memory module 100 may program the unique ID, temporarily stored in the mode register of each memory device, in an ID storage region of each memory device. Accordingly, the unique ID of each of the plurality of memory devices 101 to 10n may be permanently stored in the ID storage region of the corresponding memory device. The term 'memory module' may refers to any device, system, or part thereof that stores data. In one embodiment, the memory module may also be referred to as memory.

Referring to FIG. 1A, the storage device 10A may include the memory controller 200 and the memory module 100.

The memory controller 200 may control the memory module 100. For example, the memory controller 200 may control the memory module 100 based on requests from a processor supporting various applications such as a server application, a personal computer (PC) application, or a mobile application. For example, the memory controller 200 may be included in a host (including a processor), and may control the memory module 100 based on the requests from the processor.

The memory controller 200 may transmit commands or addresses to the memory module 100 to control the memory module 100. In addition, the memory controller 200 may transmit data to the memory module 100 or receive data from the memory module 100.

The memory module 100 may receive data from the memory controller 200 and store the received data. The memory module 100 may read the stored data in response to a request from the memory controller 200 and transmit the read data to the memory controller 200.

In an example embodiment, the memory module 100 may be a dual in-line memory module (DIMM) conforming to the joint electron device engineering council (JEDEC) standard. For example, the memory module 100 may be a registered DIMM (RDIMM), a load reduced DIMM (LRDIMM), an unbuffered DIMM (UDIMM), a fully buffered DIMM (FB-DIMM), and a small outline DIMM (SO-DIMM). In other embodiments, the memory module 100 may be another memory module such as a single in-line memory module (SIMM) or a memory module that is not defined in the JEDEC standard.

The memory module 100 may include the plurality of memory devices 101 to 10n. Each of the plurality of memory devices 101 to 10n may be implemented to store data transmitted from the memory controller 200.

In an example embodiment, each of the plurality of memory devices 101 to 10n may be various DRAM devices such as a double data rate (DDR) synchronous DRAM (SDRAM), a DDR2 SDRAM device, a DDR3 SDRAM device, a DDR4 SDRAM device, a DDR5 SDRAM device, a DDR6 SDRAM, a low power double data rate (LPDDR) SDRAM device, an LPDDR2 SDRAM device, an LPDDR3 SDRAM device, an LPDDR4 SDRAM device, an LPDDR4X SDRAM device, or an LPDDR5 SDRAM device. The memory device 11 may be a graphics DRAM device such as a graphics double data rate (GDDR) synchronous graphics random access memory (SGRAM) device, a GDDR2 SGRAM device, a GDDR3 SGRAM device, a GDDR4 SGRAM device, a GDDR5 SGRAM device, or a GDDR6 SGRAM device. In an example embodiment, the plurality of memory devices 101 to 10$n$ may be a stacked memory device in which DRAM dies are stacked, such as high bandwidth memory (HBM), HBM2, or HBM3. In an example embodiment, the plurality of memory devices 101 to 10$n$ may be an SRAM device, a NAND flash memory device, a NOR flash memory device, an RRAM device, an FRAM device, a PRAM device, a TRAM device, an MRAM device, or the like. In an example embodiment, the types of the plurality of memory devices 101 to 10$n$ may be the same or different from each other.

As shown in FIG. 1A, each of the plurality of memory devices 101 to 10$n$ may include a mode register and an ID storage region.

Mode registers 101_1 to 10$n$_1 may store set values for operating modes of corresponding memory devices, respectively. Each of the mode registers 101_1 to 10$n$_1 may temporarily store a unique ID of a corresponding memory device.

Each of the ID storage region 101_2 to 10$n$_2 may be implemented as a nonvolatile memory such as a one-time programmable (OTP) memory. Each of the ID storage region 101_1 to 10$n$_1 may permanently store a unique ID of a corresponding memory device. In this disclosure, the term 'permanently' may be 'permanently or substantially permanently.' The terms "permanently" and "substantially permanently" can be considered to mean "non-temporary". The terms "permanently" and "substantially permanently" can be considered to mean "non-volatilely".

In an example embodiment, the storage device 10A may set a unique ID for each of the plurality of memory devices 101 to 10$n$ and temporarily store the unique ID in a mode register of a corresponding memory device.

For example, the storage device 10A may support a per-DRAM addressability (PDA) mode. In the PDA mode, the memory controller 200 may set a unique ID for each of the plurality of memory devices 101 to 10$n$ and transmit each unique ID to the memory module 100. Then, in the PDA mode, the memory module 100 may receive a unique ID for each of the plurality of memory devices 101 to 10$n$ and temporarily store each unique ID in a mode register of a corresponding memory device. For example, a unique ID of the first memory device 101 may be temporarily stored in the mode register 101_1 of the first memory device 101. A unique ID of the nth memory device 10$n$ may be temporarily stored in the mode register 10$n$_1 of the nth memory device 10$n$.

In an example embodiment, the storage device 10A may program a unique ID, temporarily stored in a mode register of each memory device, in an ID storage region.

For example, in the PDA mode, the memory controller 200 may select a target memory device, among the plurality of memory devices 101 to 10$n$ of the memory module 100. For ease of description, an example may be provided in which the memory controller 200 selects the first memory device 101 of the memory module as a target memory device.

The memory controller 200 may enter a test mode register set (TMRS) mode to program the unique ID of the target memory device in the ID storage region. The term "TMRS mode" may refer to a type of test mode in which a memory module and/or a memory device is tested. In an example embodiment, the memory controller 200 may transmit a test mode entry command to the target memory device to enter test mode. The target memory device, receiving the test mode entry command from the memory controller 200, may enter the TMRS mode.

In an example embodiment, the memory controller 200 may transmit a safety key to prevent unintended entry into the TMRS mode. The target memory device may enter the TMRS mode only when the safety key is received. For example, the memory controller 200 may transmit a safety key to the target memory device to allow the target memory device to enter the TMRS mode, and the target memory device may receive the safety key to enter the TMRS mode.

In an example embodiment, the safety key may be defined as a set value of predetermined one or more TMRS commands. In an example embodiment, the safety key may be transmitted and received together with the test mode entry command. Alternatively, the safety key may be transmitted and received after the test mode entry command is transmitted and received.

Then, in the TMRS mode, the memory controller 200 may program the unique ID, stored in the mode register of the target memory device of the memory module 100, in the ID storage region of the target memory device. For example, when the first memory device 101 is selected as a target memory device, the memory controller 200 may program the unique ID, temporarily stored in the mode register 101_1 of the first memory device 101 of the memory module 100, in the ID storage region 101_2. The operation of programming the unique ID of the target memory device in the ID storage region may be referred to as an 'OTP program operation.'

In an example embodiment, the storage device 10A may select each of the plurality of memory devices 101 to 10$n$ as a target memory device in a predetermined order. Accordingly, the OTP programming operation may be performed on each of the plurality of memory devices 101 to 10$n$. As a result, the unique ID of each of the plurality of memory devices 101 to 10$n$ may be permanently stored in an ID storage region of a corresponding memory device.

In a case of a general memory module, IDs of a plurality of memory devices on a memory module are assigned in a soft setting manner. Accordingly, the IDs of the plurality of memory devices on the memory module needs to be newly set (or assigned) each time the power is turned on, which results in an increased boot time of the memory module.

The storage device 10A according to example embodiments may temporarily store a unique ID of each of the plurality of memory devices 101 to 10$n$ in a mode register of a corresponding memory device and may permanently store the unique ID, stored in the mode register, in an ID storage region. Accordingly, the storage device 10A does not need to newly set or assign the IDs of the memory devices each time power is turned on. As a result, boot time may be reduced.

In FIGS. 1B, 1C, and 1D, the storage devices 10B and 10C according to an example embodiment may support sideband communication.

For example, the memory controller 200 and the memory module 100 according to an example embodiment may communicate with each other through at least two buses. For example, the memory controller 200 and the memory module 100 may communicate with each other through a first bus 510 and a second bus 520, as illustrated in FIGS. 1B to 1D.

The first bus 510 may be used to perform general operations such as a write operation or a read operation. For example, a command, an address, and/or data used for a write operation or a read operation may be exchanged between the memory controller 200 and the memory module 100 through the first bus 510.

The second bus 520 may be used to support sideband communication. For example, the second bus 520 may be used to perform operations related to security or telemetry management. For example, operations, such as memory telemetry, authentication, management, and autonomous training, may be performed through the second bus 520. The second bus 520 may also be referred to as a 'memory management communication bus,' a memory I2C bus, an I3C bus, an improved inter-integrated circuit bus, an M3C bus, or the like.

In an example embodiment, the sideband communication through the second bus 520 may be performed by a baseboard management controller (BMC) 300. For example, as illustrated in FIG. 1B, the memory controller 200 may include a BMC 300, and the BMC 300 may perform a telemetry management operation, or the like, through the second bus 520. For example, as illustrated in FIGS. 1C and 1D, the BMC 300 may be implemented independently of the memory controller 200.

In a case in which sideband communication is supported as described above, even when the memory controller 200 or processor is powered off, the BMC 300 may continue to access the memory module 100 through the second bus 520. For example, each of the plurality of memory devices 101 to 10n may permanently store a unique ID in an ID storage region. In an example embodiment, even when the memory controller 200 or processor is powered off, the BMC 300 may be configured to check each of the plurality of memory devices 101 to 10n. As a result, even when the memory controller 200 or processor is powered off, the storage device 10B, 10C, and 10D may efficiently perform a remote telemetry management operation, or the like, on the memory devices 101 to 10n on the memory module 100.

In FIG. 1D, the memory controller 200 may be present outside the storage device 10D. For example, the storage device 10D may include a memory module 100, and the storage device 10D and the memory controller 200 may be implemented independently of each other. For example, the memory controller 200 may be included in various external devices such as testing equipment, inspection equipment, or packaging equipment.

The memory controller 200 may set a unique ID for each of the plurality of memory devices 101 to 10n included in the memory module 100. The memory module 100 may temporarily store the unique ID for each of the plurality of memory devices 101 to 10n in a mode register of a corresponding memory device. Then, the memory module 100 may program the unique ID, temporarily stored in the mode register of each memory device, in an ID storage region of each memory device. Accordingly, the unique ID for each of the plurality of memory devices 101 to 10n may be permanently stored in the ID storage region of the corresponding memory device.

As set forth in FIGS. 1A to 1D, the storage device 10A, 10B, 10C, and 10D may permanently store a unique ID for each of the plurality of memory devices 101 to 10n, included in the memory module 100, in an ID storage region of a corresponding memory device.

Figure 2:
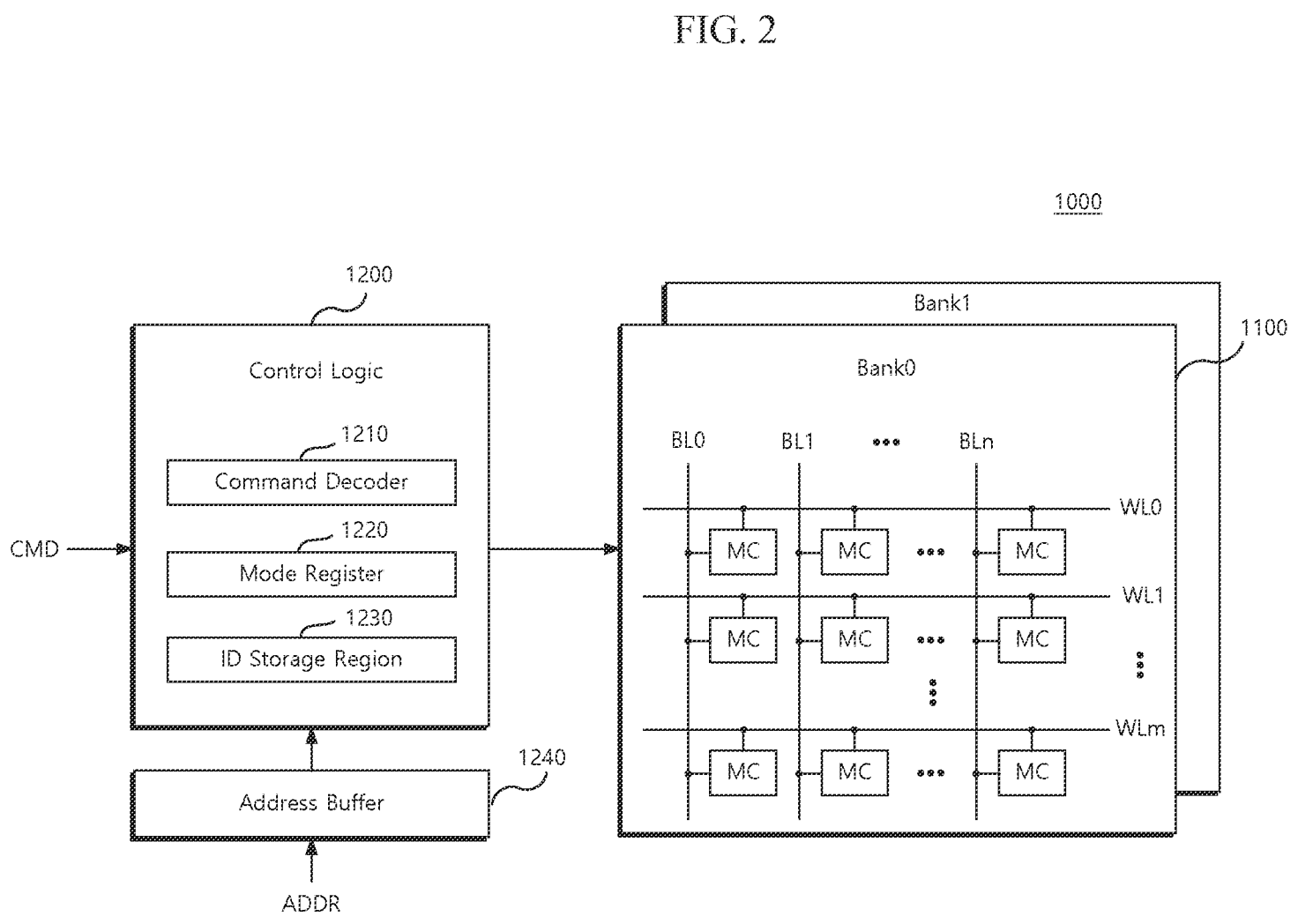

FIG. 2 is a block diagram illustrating an example of a memory device according to an example embodiment.

The memory device 1000 of FIG. 2 may be one of the memory devices 101 to 10n on the memory module 100 of FIGS. 1A to 1D.

Referring to FIG. 2, the memory device 1000 may include a control logic 1200, an address buffer 1240, and a memory cell array 1100.

The control logic 1200 may control the operation of the memory device 1000. The control logic 1200 may generate control signals for the memory device 1000 to perform s write operation or a read operation. Additionally, the control logic 1200 may generate control signals for the memory device 1000 to perform the PDA mode and the TMRS mode, according to an example the embodiment. The control logic 1200 may include a command decoder 1210, a mode register 1220, and an ID storage region 1230.

The command decoder 1210 may decode a command CMD received from the memory controller 200 (see FIGS. 1A to ID) and generate an internal command signal corresponding to the command CMD.

In an example embodiment, in the PDA mode, the command decoder 1210 may receive multi-purpose CMD command (MPC) and decode the received MPC to generate an internal command signal. For example, in the PDA mode, the command decoder 1210 may decode the MPC to generate an internal command signal for entering PDA mode, an internal command signal for setting a unique ID, an internal command signal for selecting a target memory device, and an internal command signal for exiting PDA mode.

In an example embodiment, in the TMRS mode, the command decoder 1210 may receive and decode a TMRS command, a mode register write command, or the like, in order to generate an internal command signal.

The mode register 1220 may store a set value for operating mode of a corresponding memory device. Additionally, the mode register 1220 may temporarily store the unique ID of the memory device 1000 set in the PDA mode. In an example embodiment, the mode register 1220 may store a safety key sequence having a predetermined order and/or set value.

The ID storage region 1230 may store a unique ID corresponding to the memory device 1000. For example, the ID storage region 1230 may be implemented as an OTP memory. Accordingly, the ID storage region 1230 may permanently store the unique ID of the memory device 1000.

For example, the ID storage region 1230 may be implemented as one of OTP memories such as an anti-fuse array, a mask read-only memory (MROM), or an OTP programmable read only memory (OTP PROM). According to other example embodiments, the ID storage region 1230 may be implemented as one of non-volatile memories such as an e-fuse array, a NAND flash memory, a NOR flash memory, a magnetic random access memory (MRAM), a spin torque transfer-MRAM (STT-MRAM), a resistive random access memory (ReRAM), or a phase change random access memory (PRAM).

The address buffer 1240 may receive an address signal including a bank address, a row address, and/or a column address from the memory controller 200. Write and read operations may be performed on a memory cell MC in the memory cell array 1100 selected by the address signal.

The memory cell array 1100 may include one or more banks Bank0 and Bank1, and each of the banks Bank0 and Bank1 may include a plurality of memory cells MC connected to a plurality of wordlines WL0 to WLm and a plurality of bitlines BL0 to BLn. Data transmitted from the memory controller 200 may be stored in the plurality of memory cells MC.

Figure 3:
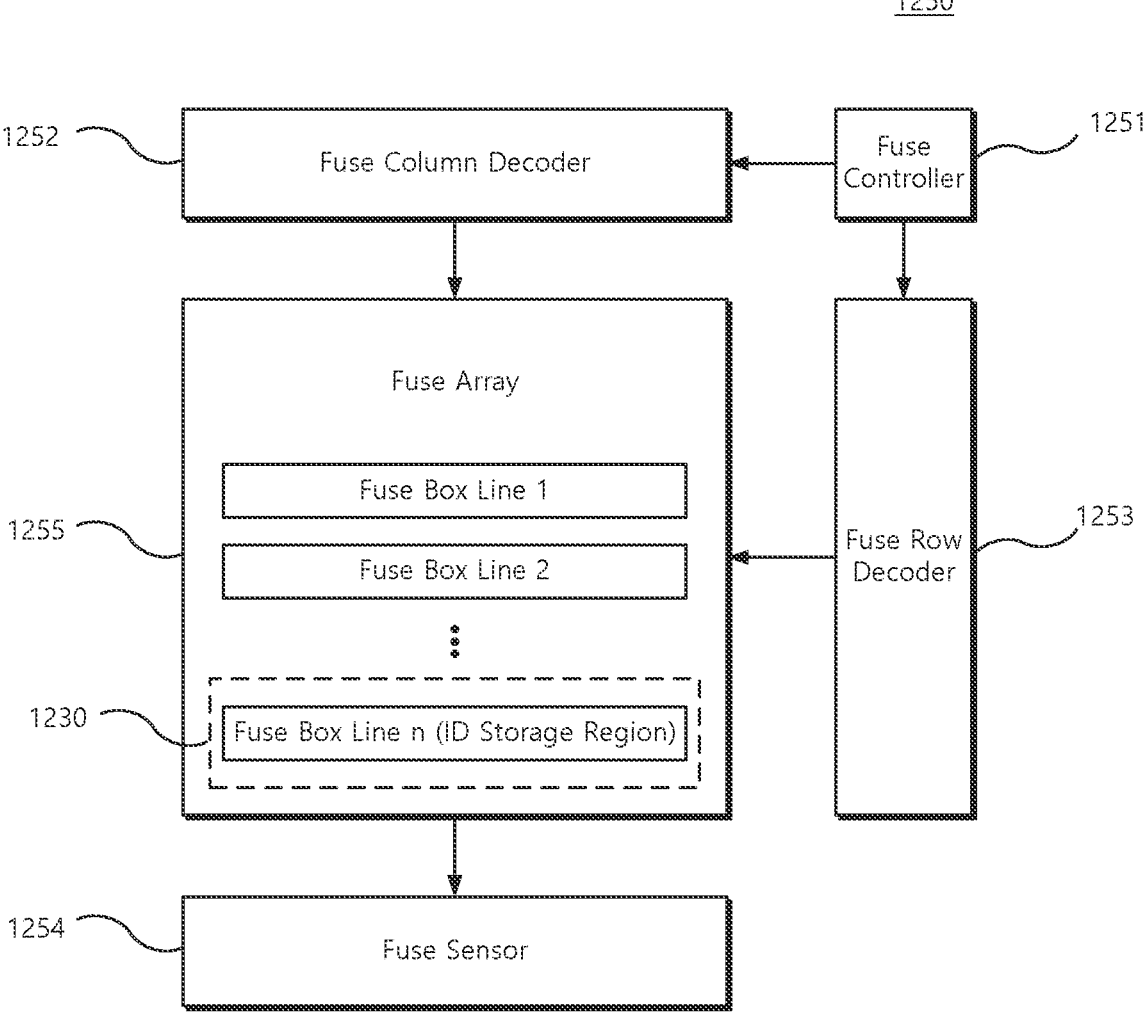
FIGS. 3 and 4 are diagrams illustrating an example, in which an ID storage region of FIG. 2 is implemented using a fuse array.
Figure 4:
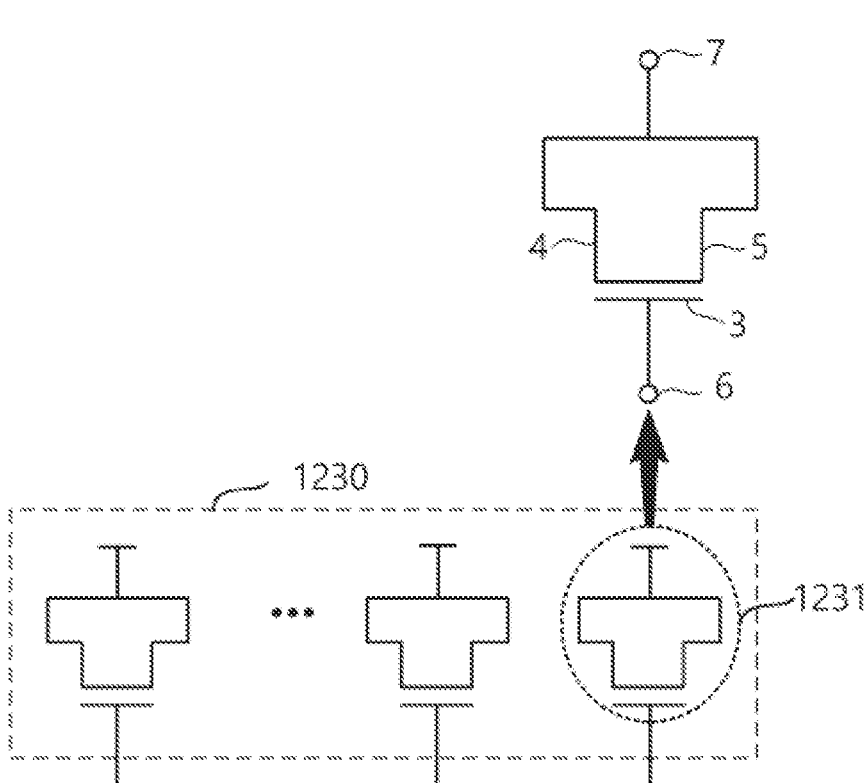

FIGS. 3 and 4 are diagrams illustrating an example, in which the ID storage region 1230 of FIG. 2 is implemented through a fuse array. FIG. 3 illustrates an example of a fuse circuit 1250 including the ID storage region 1230 of FIG. 2. FIG. 4 illustrates an example of implementing the ID storage region 1230 using anti-fuse cells of a fuse array. For ease of description, an example will be provided in which the fuse circuit 1250 is implemented to be included in the control logic 1200.

Referring to FIG. 3, the fuse circuit 1250 may include a fuse controller 1251, a fuse column decoder 1252, a fuse row decoder 1253, a fuse sensor 1254, and a fuse array 1255.

The fuse controller 1251 may be electrically connected to the fuse column decoder 1252 and the fuse row decoder 1253, and may control the overall operation of the fuse circuit 1250. The fuse column decoder 1252 may select a column of fuse cells in the fuse array 1255.

The fuse row decoder 1253 may select a row of fuse cells in the fuse array 1255. The fuse sensing circuit 1254 may detect whether the fuse cells in the fuse array 1255 are programmed. The fuse array 1255 may include a plurality of fuse box lines Fuse Box Line I to Fuse Box Line n. Each of the plurality of fuse box lines Fuse Box Line 1 to Fuse Box Line n may include a plurality of fuse cells.

In an example embodiment, a portion of the plurality of fuse box lines 'Fuse Box Line I' to 'Fuse Box Line n' may be used for repair operations. For example, in a post-package repair operation, the first fuse box line (Fuse Box Line 1) may be used to program a single failed address.

In an example embodiment, a portion of the plurality of fuse box lines 'Fuse Box Line 1' to 'Fuse Box Line n' may be used to permanently store the unique ID of the memory device 1000 (see FIG. 2). For example, a portion of the plurality of fuse box lines (Fuse Box Line 1 to Fuse Box Line n) may be used as the ID storage region 1230 of FIG. 2. For example, as illustrated in FIG. 3, an nth fuse box line Fuse Box Line n may be designated as the ID storage region 1230. The unique ID of the memory device 1000 may be programmed in the nth fuse box line (Fuse Box Line n), the ID storage region 1230, during an OTP programming operation.

Referring to FIG. 4, the nth fuse box line (Fuse Box Line n), the ID storage region 1230, may include a plurality of antifuses 1231. Each antifuse may have a unique column address and a unique row address.

An antifuse 1231 may be a resistive element having electrical characteristics opposite to those of a fuse element. An antifuse 1231 may have a high-resistance value in an unprogrammed state and a low-resistance value in a programmed state.

An antifuse 1231 may generally be configured in a form in which a dielectric is inserted between two conductors. A program operation may be performed on the antifuse 1231 by applying a high voltage between two conductors on opposite ends of the antifuse 1231 to rupture the dielectric between the two conductors. As a result of the program operation, the two conductors on the opposite ends of the antifuse 1231 may be short-circuited. Thus, the antifuse 1231 may have a low-resistance value.

For example, the antifuse 1231 may be configured as a depletion-type MOS transistor in which a source 4 and a drain 5 are connected to each other. In an initial state, resistance between a first node 6 (connected to a gate electrode 3) and a second node 7 (commonly connected to the source 4 and the drain 5) may be significantly high because the first node 6 and the second node 7 are separated by a gate oxide layer. This state may be set as an unprogrammed state.

The gate oxide of the antifuse 1231 may be ruptured by applying a breakdown voltage between the first node 6 and the second node 7. When the gate oxide is ruptured, the resistance between the first node 6 and the second node 7 may be decreased. This state may be set as a programmed state.

As described above, the ID storage region 1230 may be implemented to include antifuses. By rupturing the gate oxide of the antifuse during the OTP programming operation, the unique ID of the memory device 1000 may be permanently programmed in the ID storage region 1230.

In FIGS. 3 and 4, an example is provided in which the ID storage region 1230 is implemented using a single fuse box line, but example embodiments are not limited thereto. For example, the ID storage region 1230 may be implemented using a plurality of fuse box lines.

In FIGS. 2 and 3, the fuse circuit 1250 has been described as being included in the control logic 1200. In other embodiments, the fuse circuit 1250 may be implemented independently of the control logic 1200.

Figure 5:
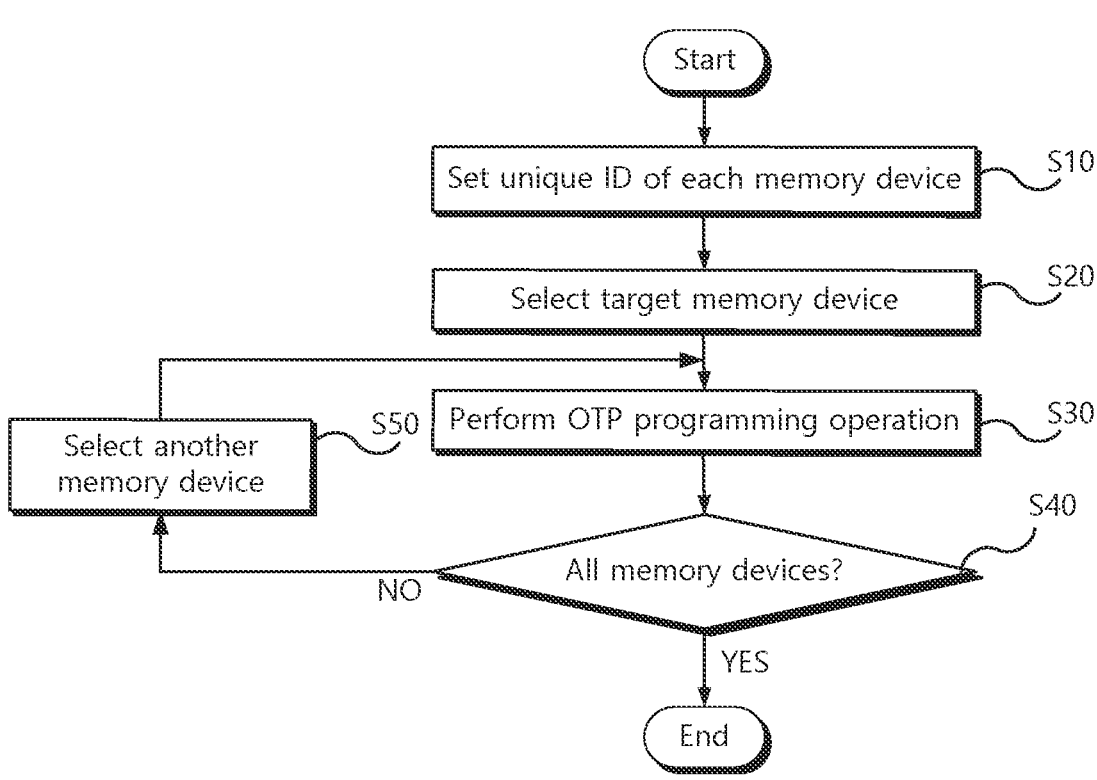
FIG. 5 is a flowchart illustrating an example of the operation of a storage device according to an example embodiment.

FIG. 5 is a flowchart illustrating an example of the operation of a storage device according to an example embodiment.

In operation S10, the storage device may set a unique ID for each of the plurality of memory devices.

For example, each of the storage devices 10A to 10D (see FIGS. 1A to 1D) may support the PDA mode. In the PDA mode, the memory controller 200 (see FIGS. 1A to 1D) may set a unique ID for each of the plurality of memory devices 101 to 10n (see FIGS. 1A to 1D).

In an example embodiment, the memory controller 200 may transmit the unique ID of each memory device to the memory module 100. The memory controller 200 may temporarily store the unique ID in a mode register of a corresponding memory device.

In an example embodiment, each memory device of the memory module 100 may receive the corresponding unique ID from the memory controller 200 and temporarily store the received unique ID in the mode register. For example, through the PDA mode, the memory controller 200 may set a unique ID for each of the plurality of memory devices 101 to 10n included in the memory module 100, and each of the memory devices 101 to 10n of the memory module 100 may receive the unique ID from the memory controller 200 and temporarily store the received unique ID in each of the mode registers 101_1 to 10n_1 of the memory devices 101 to 10n. According to example embodiments, each memory device may temporarily store a corresponding unique ID in a register, buffer memory, or the like, other than the mode register.

In operation S20, the storage device may select a target memory device.

For example, in the PDA mode, the memory controller 200 may select one of the plurality of memory devices 101 to 10n of the memory module 100 as a target memory device. According to example embodiments, the memory controller 200 may select two or more memory devices as target memory devices.

In operation S30, the storage device may perform an OTP program operation to permanently store a unique ID of the target memory device in the ID storage region.

For example, the storage device may support the TMRS mode, and the OTP program operation may be performed through the TMRS mode. For example, in the TMRS mode, the memory controller 200 may transmit address information of an ID storage region of the target memory device to the target memory device. The target memory device may receive the address information of the ID storage region and program a unique ID of the target memory device in a corresponding ID storage region. An operation of permanently storing the unique ID in the ID storage region may be referred to as, for example, an OTP program operation.

In operation S40, the storage device may check whether an OTP program operation has been performed on all memory devices included in the memory. For example, the memory controller 200 may check whether an OTP program operation has been performed on all memory devices included in the memory.

When there is a memory device on which an OTP program operation has not been performed, in operation S50, the memory controller 200 may re-select one of the memory devices, on which an OTP program operation has not been performed, as a target memory device. In an example embodiment, an OTP program operation may be performed on the newly selected target memory device.

As described above, the memory controller according to an example embodiment may temporarily store the unique ID corresponding to each of the plurality of memory devices in the mode register of the memory device and then program the unique ID, temporarily stored in the mode register, in the ID storage region. Accordingly, the unique ID of each of the plurality of memory devices may be permanently stored in the ID storage region of the corresponding memory device.

Figure 6:
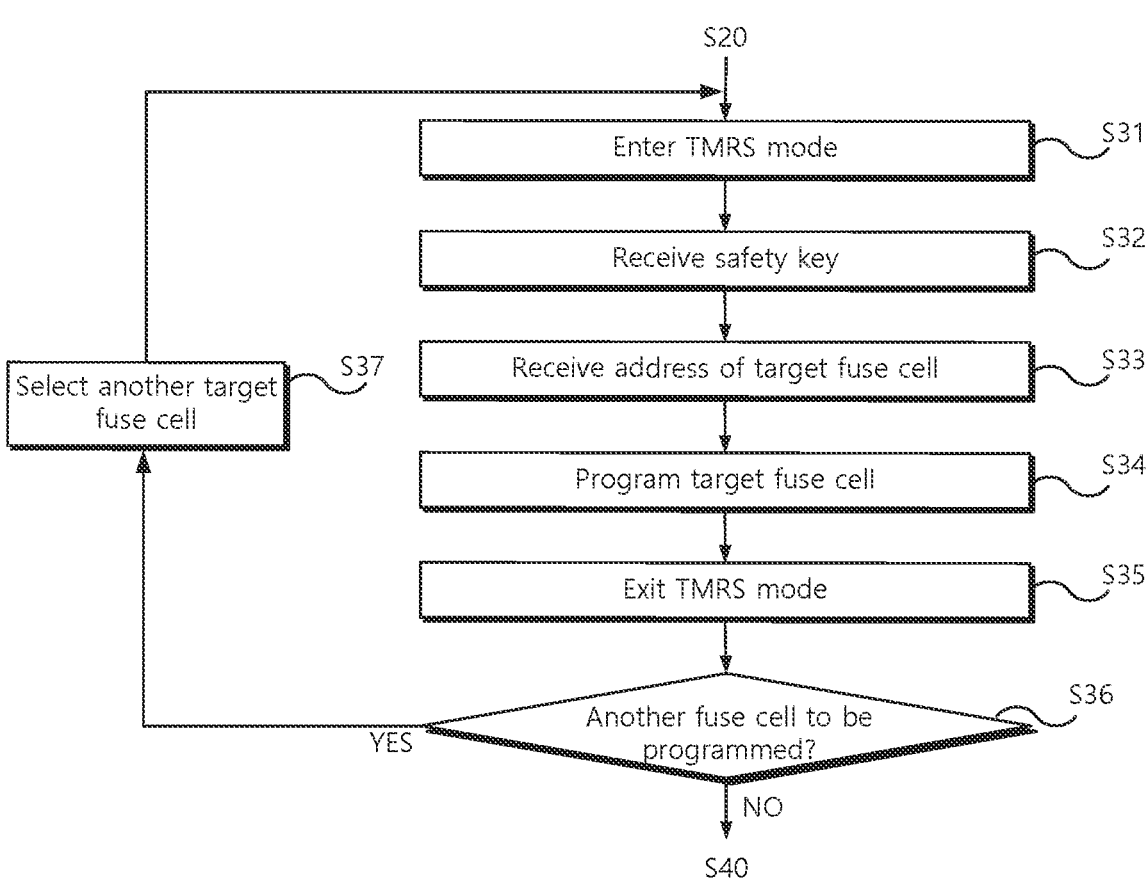
FIG. 6 is a flowchart illustrating an example of a one-time programmable (OTP) program operation according to an example embodiment.

FIG. 6 is a flowchart illustrating an example of an OTP program operation according to an example embodiment. The OTP program operation of FIG. 6 corresponds to operation S30 of FIG. 5.

In operation S31, the target memory device of the memory may enter the TMRS mode.

For example, the memory controller 200 (see FIGS. 1A to 1D) may transmit a test mode register set one-time programmable (TMRS_OTP) command to the target memory device of the memory module 100 (see FIGS. 1A to 1D). The target memory device may enter the TMRS mode in respond to the TMRS_OTP command.

In operation S32, the target memory device of the memory module may receive a safety key.

The safety key may be used to prevent a unique ID from being accidentally permanently stored in the ID storage region. For example, the safety key may be used to protect the OTP program operation.

In an example embodiment, the safety key may be defined as a predetermined set value of the TMRS command. For example, the memory controller 200 may transmit at least one TMRS command having a predetermined set value to the target memory device of the memory module 100. The target memory device may check whether the set value of the TMRS received from the memory controller 200 matches a predetermined set value. When the received TMRS set value matches the predetermined set value, the target memory device may perform the following OTP program operation. When the received TMRS set value does not match the predetermined set value, the target memory device may terminate the TMRS mode.

In an example embodiment, the safety key may be defined to include a plurality of safety keys. For example, the safety key may be configured as a sequence of a plurality of mode register write commands MRW, and the memory controller

200 may sequentially transmit a plurality of mode register write commands, matching the order and/or the set value of the safety key sequence, to the target memory device of the memory module 100. When the received safety key sequence matches the order and/or the set value of the predetermined safety key sequence, the target memory device may perform the following OTP program operation.

In operation S33, the target memory device may receive address information of the target fuse cell.

The target fuse cell may refer to fuse cells to be programmed, among a plurality of fuse cells included in the ID storage region. For example, one of the fuse cells storing a value of '1,' among bit values of the unique ID of the target memory device, may be selected as a target fuse cell.

For example, a unique ID value of each memory device may be expressed as a five-digit binary number. In an example embodiment, the five digits may correspond to first to fifth fuse cells, respectively. For example, a least significant bit may correspond to the first fuse cell, the next bit may correspond to the second fuse cell, and the most significant bit may correspond to the fifth fuse cell.

For example, when the unique ID value of the target memory device '10001,' fuse cells to store a value of '1' for the unique ID bits of the target memory device may be the first fuse cell or the fifth fuse cell. In an example embodiment, one of the first and fifth fuse cells may be selected as a target fuse cell. For example, when the first fuse cell is selected as the target fuse cell, address information of the target fuse cell of the target memory device received by the target memory device in operation S33 may correspond to the address information of the first fuse cell of the target memory device.

In an example embodiment, the ID storage region 1230 (see FIG. 4) may be implemented to include antifuse cells. In an example embodiment, the memory controller 200 may transmit address information of antifuse cells on which a rupture operation is to be performed, among the plurality of antifuse cells included in the ID storage region 1230, to the target memory device of the memory module 100. The rupture operation may refer to an operation of rupturing the gate oxide of the antifuse cell. The target memory device may select an antifuse cell corresponding to the received address information as a target fuse cell.

In an example embodiment, the ID storage region 1230 may be implemented to include electrical fuse cells. In an example embodiment, the memory controller 200 may transmit address information of laser fuse cells on which a cutting operation is to be performed, among a plurality of electrical fuse cells included in the ID storage region 1230, to the target memory device of the memory module 100. The target memory device may select an electrical fuse cell corresponding to the received address information as a target fuse cell.

In operation S34, the target memory device may perform a program operation on the target fuse cell.

For example, the memory controller 200 may transmit a test mode register set active (TMRS_ACT) command to the target memory device of the memory module 100. The target memory device may perform a program operation on the target fuse cell in respond to the TMRS_ACT command. In an example embodiment, the term "test mode register set active (TMRS_ACT) command" may be referred to as "mode register set active (MRS_ACT) command".

In an example embodiment, when the ID storage region 1230 (see FIG. 4) is implemented to include antifuse cells, the target memory device may perform a rupture operation of the target fuse cell of the target memory device corresponding to the address information of the target fuse cell received in operation S33. For example, when the memory receives address information corresponding to the first fuse cell in operation S33, the target memory device may perform a rupture operation of the first fuse cell, the target fuse cell of the target memory device, in response to the test mode register set active (TMRS_ACT Mode) command received in operation S34.

In an example embodiment, when the ID storage region 1230 (see FIG. 4) is implemented to include electrical fuse cells, the target memory device may perform a cutting operation of the target fuse cell of the target memory device corresponding to the address information of the target fuse cell received in operation S33. For example, when the memory module receives address information corresponding to the first fuse in operation S33, the target memory device may perform the cutting operation of the first fuse, the target fuse cell of the target memory device, in response to the test mode register set active (TMRS_ACT) command received in operation S34.

In operation S35, the target memory device may terminate (exit) the TMRS mode.

For example, the memory controller 200 may transmit the mode register set active (MRS_ACT) command to the target memory device of the memory module 100. The target memory device may terminate the TMRS mode in response to the mode register set active (MRS_ACT) command.

In operation S36, a check may be made as to whether there is another fuse cell on which a program operation is to be performed.

For example, the memory controller 200 may check whether there is another fuse cell to store a value of '1,' among the bit values for the unique ID of the target memory device.

When there is another fuse cell to store the value of '1,' the flow proceeds to operation S37 in which the memory controller 200 may select one of the fuse cells to store the value of '1' as a target fuse cell. When there are no more fuse cells to store the value of '1,' the memory controller 200 may determine that the OTP program operation of programming the unique ID of the target memory device in the ID storage region is completed.

As described in FIG. 6, the storage device according to an example embodiment may permanently store the unique ID of the target memory device in the ID storage region through TMRS mode. In an example embodiment, the storage device may prevent an unintended OTP program operation using a safety key. As a result, the storage device according to an example embodiment may safely permanently store the unique ID of the target memory device in the ID storage region.

Figure 7:
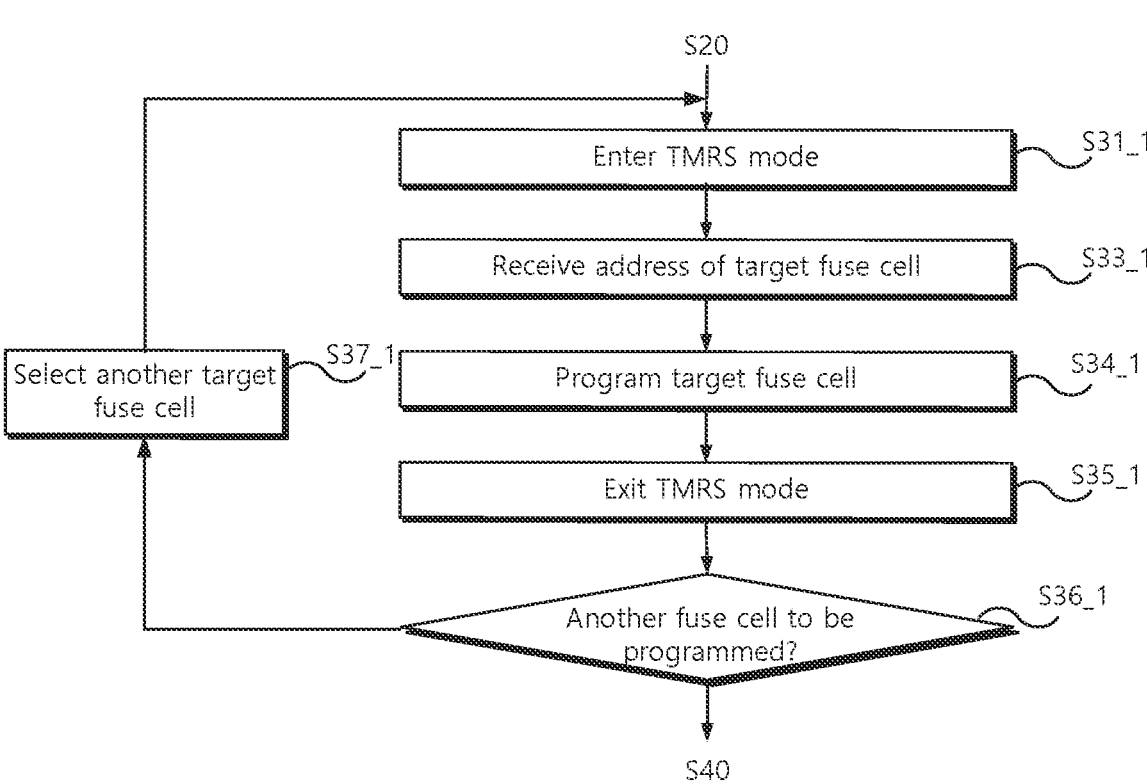
FIG. 7 is a flowchart illustrating an example of the OTP program operation according to an example embodiment.

FIG. 7 is a flowchart illustrating another example of an OTP program operation according to an example embodiment. The OTP program operation of FIG. 7 is similar to the OTP program operation of FIG. 6. Therefore, the same or similar operations are denoted by the same or similar reference numerals, and duplicate descriptions will be omitted below.

In FIG. 6, the program operation has been described as being performed on the target fuse cell only when passing the safety key. Example embodiments are not limited thereto. In example embodiments, the operation in which the memory module receives the safety key may be omitted. Alternatively, in example embodiments, the operation of receiving the safety key may be integrated with the operation of entering the TMRS mode.

In operation S31_1, the target memory device may enter the TMRS mode (for example, see operation S31 of FIG. 6).

For example, the memory controller may transmit the TMRS_OTP command to the memory module, and the target memory device may enter the TMRS mode in response to the TMRS_OTP command.

In an example embodiment, the TMRS_OTP command may be set to act as a safety key. For example, the TMRS_OTP command may include a plurality of TMRS commands, and each of the TMRS commands may have a predefined order and/or set value. In an example embodiment, the target memory device may enter the TMRS mode only when the order and/or set value of the TMRS commands received from the memory controller 200 matches a predefined order and/or set value.

In operation S33_1, the target memory device may receive address information of a target fuse cell (for example, see operation S33 of FIG. 6).

In operation S34_1, the target memory device may perform a program operation on the target fuse cell (for example, see operation S34 of FIG. 6).

In operation S35_1, the target memory device may terminate the TMRS mode (for example, see operation S35 of FIG. 6).

In operation S36_1, a check may be made as whether there is another fuse cell on which the program operation is to be performed (for example, see operation S36 of FIG. 6). For example, the memory controller 200 may check whether there are more fuse cells to store the value of '1,' among the bit values of the unique ID of the target memory device.

In operation S37_1, when there are more fuse cells to store the value of '1,' the memory controller 200 may select one of the fuse cells to store the value of '1' as the target fuse cell (for example, S37 of FIG. 6). When there are no more fuse cells to store the value of '1,' the memory controller 200 may determine that the OTP program operation of programming the unique ID of the target memory device in the ID storage region is complete, and operation S40 may be performed.

Figure 8:
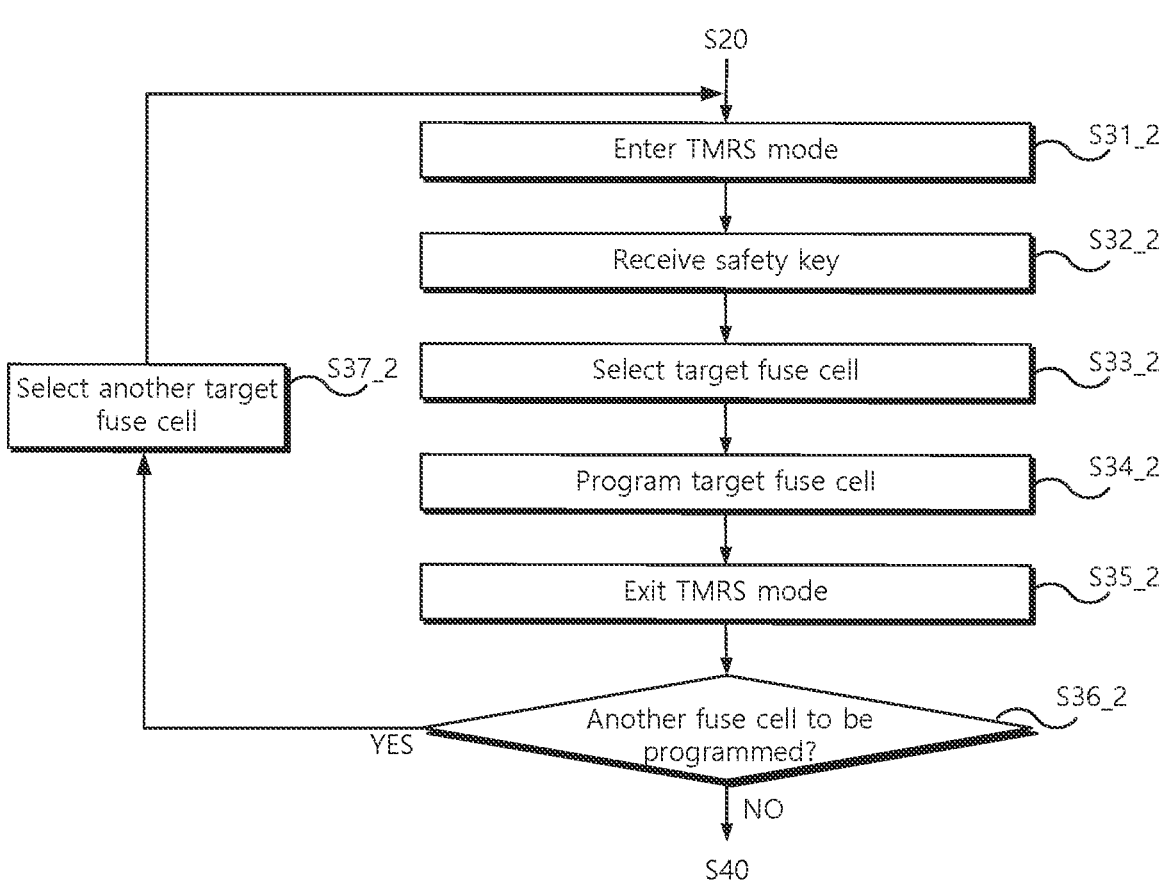
FIG. 8 is a flowchart illustrating an example of the OTP program operation according to an example embodiment.

FIG. 8 is a flowchart illustrating an example of the OTP program operation according to an example embodiment. The OTP program operation of FIG. 8 is similar to the OTP program operation of FIG. 6. Therefore, the same or similar operations are denoted by the same or similar reference numerals, and duplicate descriptions will be omitted below.

In FIG. 6, the target memory device has been described as receiving the address information of the target fuse cell from the memory controller 200. Example embodiments are not limited thereto. In example embodiments, the target memory device may not receive the address information of the target fuse cell from the memory controller 200. In an example embodiment, the target memory device may independently select a target fuse cell from among a plurality of fuse cells included in an ID storage region, based on information on a unique ID stored in each mode register.

In operation S31_2, the target memory device may enter the TMRS mode (for example, see operation S31 of FIG. 6)

In operation S32_2, the target memory device may receive a safety key (for example, see operation S32 of FIG. 6).

In operation S33_2, the target memory device may select a target fuse cell.

For example, the target memory device of the memory module 100 (see FIGS. 1A to 1D) may select the target fuse cell to be programmed to '1' from among the plurality of fuse cells included in the ID storage region 1230 (see FIG. 4), based on the unique ID information stored in the mode register 1220 (see FIG. 2).

Compared to operation S33 of FIG. 6, in operation S33_2, the target memory device does not directly receive the address information of the target fuse cell from the memory controller 200, but may select the target fuse cell based on information of a unique ID of a target memory device, stored in a mode register of the target memory device, based on a unique ID for each of the plurality of memory devices 101 to 10n temporarily stored in the mode registers 101_1 to 10n_1 of each of the memory devices 101 to 10n (for example, see operation S10 of FIG. 5).

In operation S34_2, the target memory device may perform a program operation on the target fuse cell (for example, see operation S34 of FIG. 6). In operation S35_2, the target memory device may terminate the TMRS mode (for example, see operation S35 of FIG. 6). In operation S36_2, a check may be made as to whether there is another fuse cell on which the program operation will be performed (for example, see operation S36 of FIG. 6).

Figure 9:
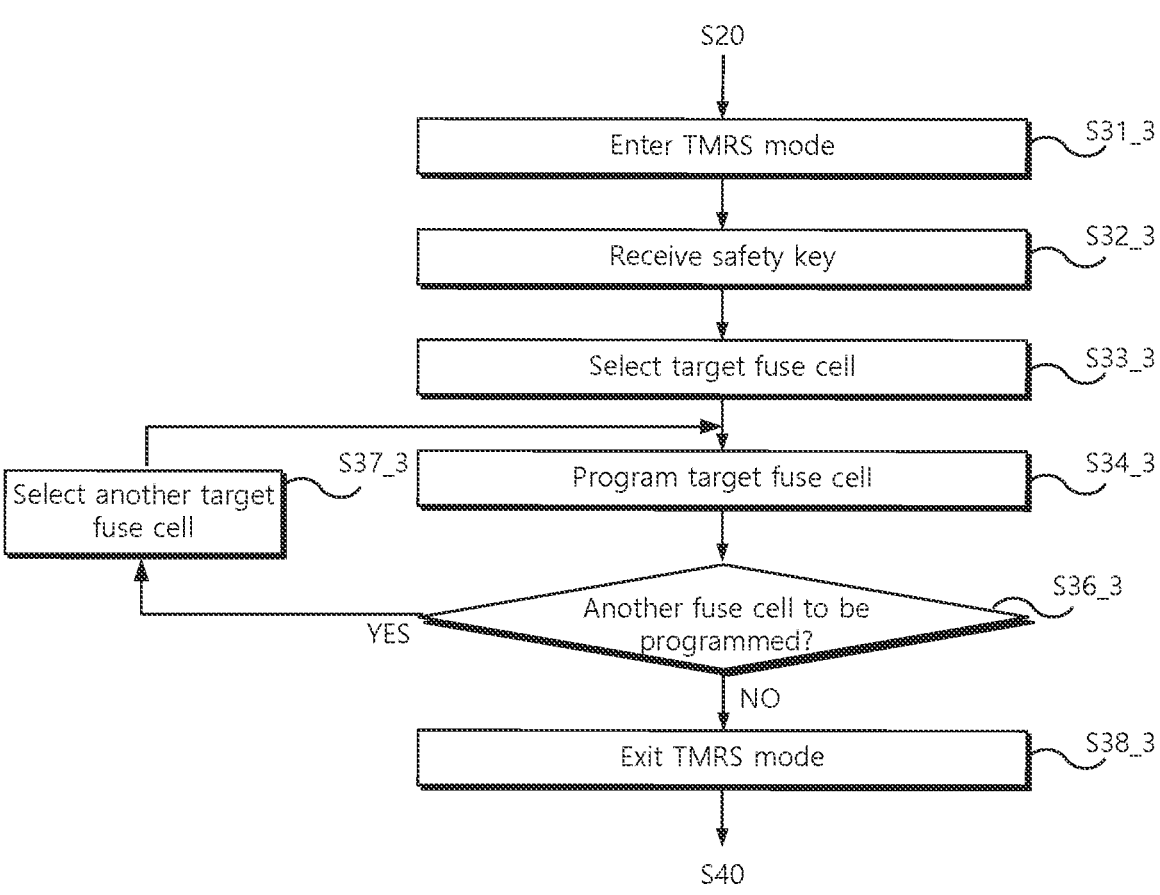
FIG. 9 is a flowchart illustrating an example of the OTP program operation according to an example embodiment.

FIG. 9 is a flowchart illustrating an example of the OTP program operation according to an example embodiment. The OTP program operation of FIG. 9 is similar to the OTP program operations of FIGS. 6 and 8. Therefore, the same or similar operations are denoted by the same or similar reference numerals, and duplicate descriptions will be omitted below.

In FIGS. 6 and 8, the target memory device has been described as receiving the safety key whenever a target fuse cell is selected. Example embodiments are not limited thereto. In example embodiments, the target fuse cells may be protected by the same safety key. For example, after passing the safety key in TMRS mode, the OTP program operation may be continuously performed on target fuse cells.

In operation S31_3, the target memory device may enter the TMRS mode (for example, see operation S31 of FIG. 6). In operation S32_3, the target memory device may receive a safety key (for example, see operation S32 of FIG. 6). In operation S33_3, the target memory device may select a target fuse cell (for example, see operation S33 of FIG. 6). In operation S34_3, the target memory device may perform a program operation on the target fuse cell (for example, see operation S34 of FIG. 6). In operation S36_3, a check may be made as to whether there is another fuse cell on which the program operation is to be performed (for example, see operation S36 of FIG. 6).

When there are more fuse cells to store the value of '1,' the memory controller may select one of the fuse cells to store the value of '1' as a target fuse cell of the target memory device operation S37_3. Then, a program operation may be performed on the selected target fuse cell.

When there are no more fuse cells to store the value of '1,' the flow proceeds to operation S38_3 in which the memory controller may determine that the OTP program operation of programming the unique ID of the target memory device in the ID storage region is complete and terminate TMRS mode (for example, see operation S35 of FIG. 6).

As described above, the program operations on the target fuse cells may be protected by the same safety key. As a result, the OTP program operation according to an example embodiment may be performed more rapidly.

Figure 10:
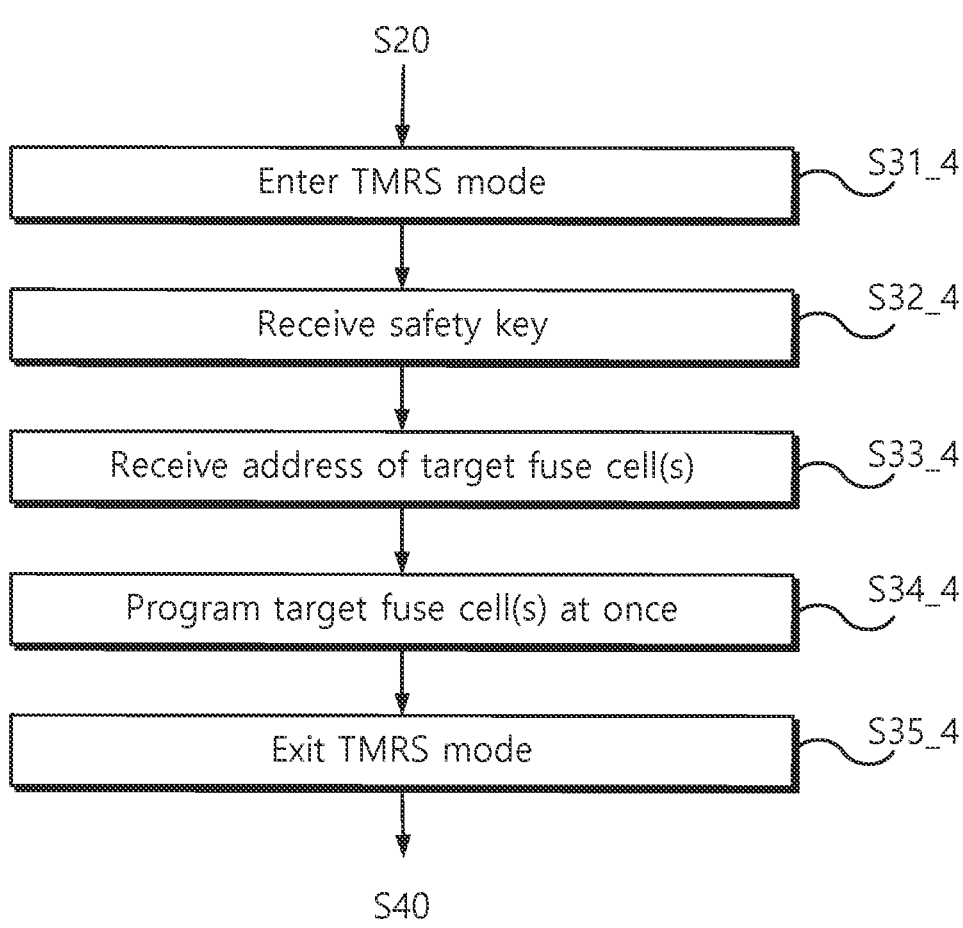
FIG. 10 is a flowchart illustrating an example of the OTP program operation according to an example embodiment.

FIG. 10 is a flowchart illustrating an example of the OTP program operation according to an example embodiment. The OTP program operation of FIG. 10 is similar to the OTP program operations of FIGS. 6 and 8. Therefore, the same or similar operations are denoted by the same or similar reference numerals, and duplicate descriptions will be omitted below.

In FIGS. 6 and 9, the target memory device has been described as performing a program operation on a single target fuse cell. For example, in FIGS. 6 and 9, the target memory device has been described as being able to perform a program operation on a single target fuse cell of a single target memory device at a time. For example, in FIGS. 6 and 9, the target memory device has been described as receiving address information of a single target fuse cell, selecting a single target fuse cell, and repeatedly performing a program operation on a plurality of target fuse cells. Example embodiments are not limited thereto. In example embodiments, the target memory device may select a plurality of target fuse cells at a time and perform a program operation on the selected target fuse cells at a time.

In operation S31_4, a target memory device may enter the TMRS mode (for example, see operation S31 of FIG. 6).

In operation S32_4, the target memory device may receive a safety key (for example, see operation S32 of FIG. 6).

In operation S33_4, the target memory device may receive address information of the target fuse cells (for example, see operation S33 of FIG. 6).

For example, the memory controller may transmit address information of one or more target fuse cells to be programmed to '1,' among a plurality of fuse cells in an ID storage region, to a target memory device of a memory based on the unique ID of the target memory device. Accordingly, the target memory device may receive the address information on the plurality of target fuse cells.

In operation S34_4, the target memory device may perform a program operation on the plurality of target fuse cells at a time (for example, see operation S34 of FIG. 6).

In operation S35_4, the target memory device may terminate the TMRS mode (for example, see operation S35 of FIG. 6).

As described above, the program operation may be performed on the target fuse cells may be performed at a time. As a result, the OTP program operation according to an example embodiment may be performed more rapidly.

Figure 11:
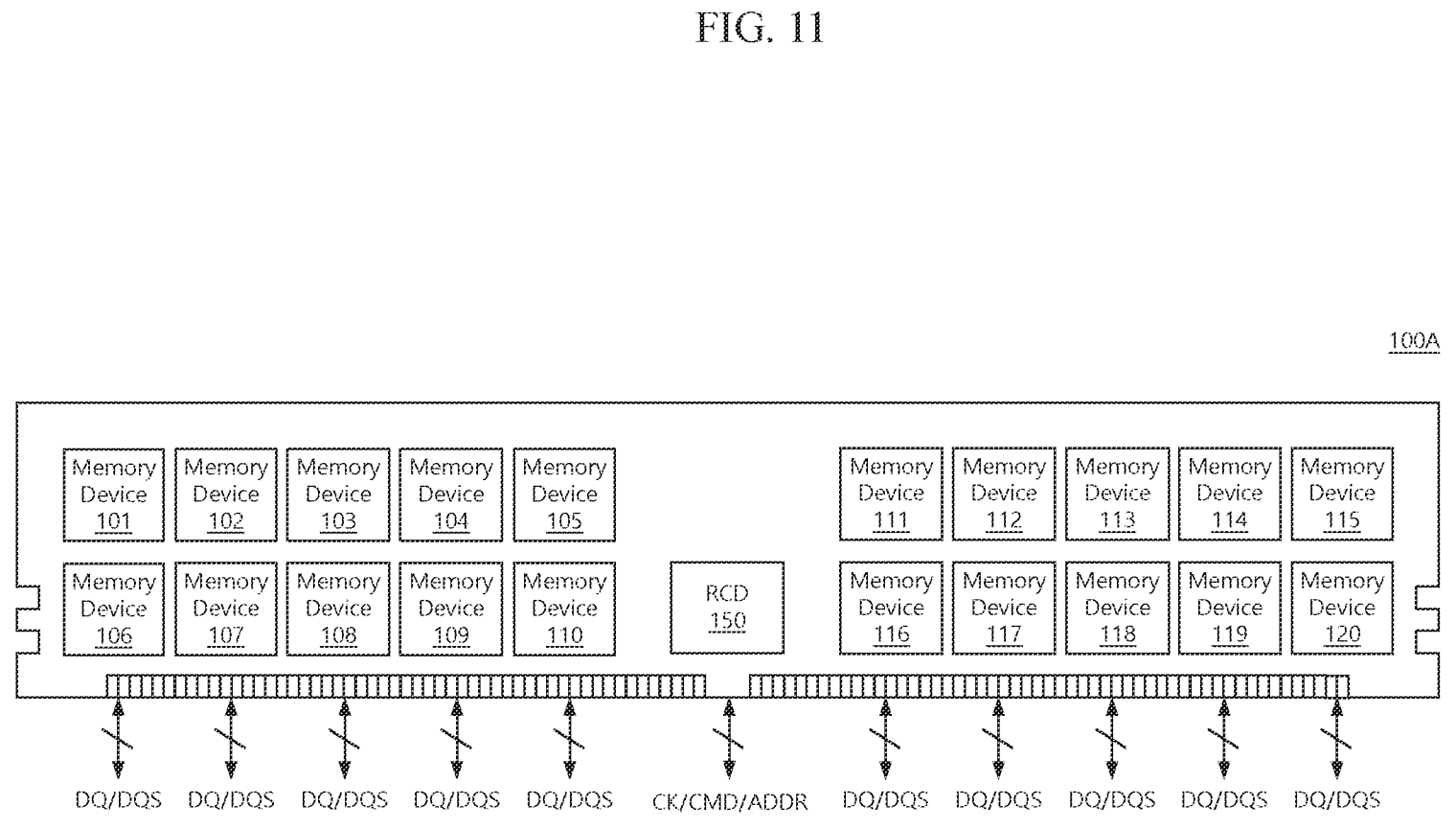
Figure 12:
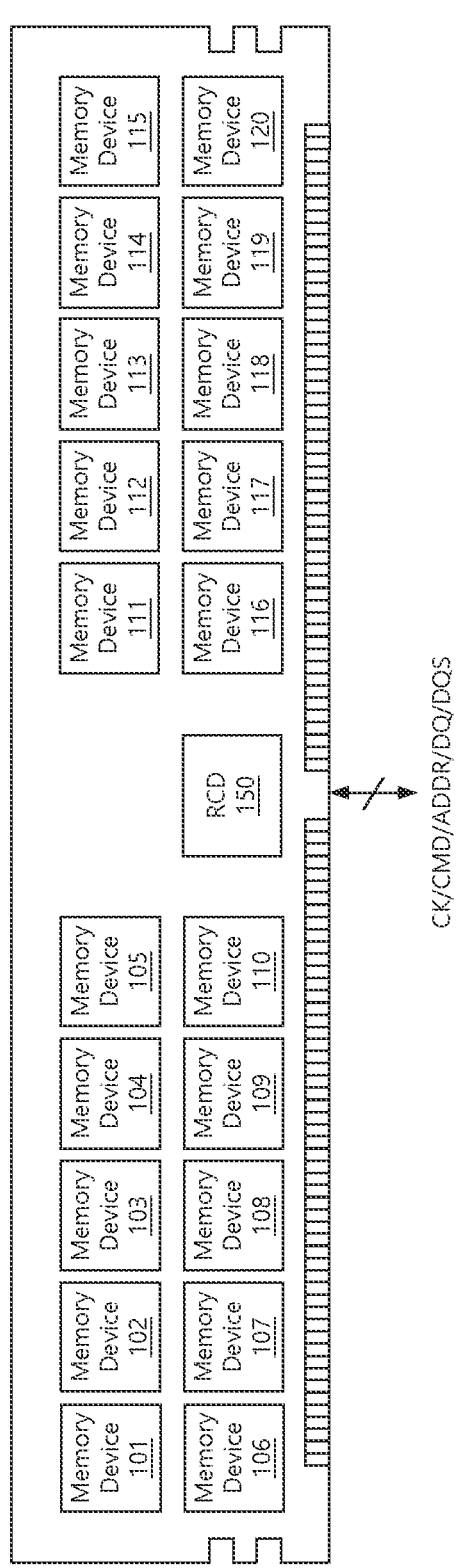
Figure 13:
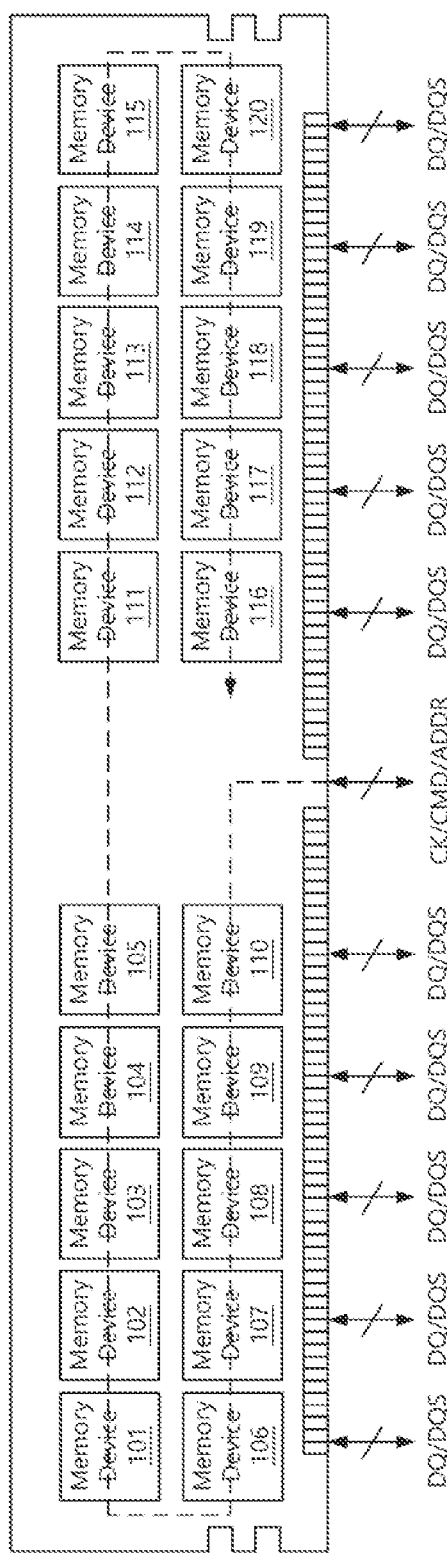

FIGS. 11 to 13 are diagrams illustrating an example of a memory module according to an example embodiment. The memory modules 100A, 100B, and 100C of FIGS. 11 to 13 may be one of the memories 100 of FIGS. 1A to 1D.

Referring to FIGS. 11 and 12, each of the memory modules 100A and 100B may include a plurality of memory devices 101 to 120 and a register clock driver (RCD) 150. The plurality of memory devices 101 to 120 may be disposed to be separated to the left and right with respect to the register clock driver 150.

Each of the memory modules 100A and 100B may be a DIMM conforming to the JEDEC standard. For example, the memory module 100A may be a registered DIMM (RDIMM), a load reduced DIMM (LRDIMMO, an unbuffered DIMM (UDIMM), a fully buffered DIMM (FB-DIMM), a small outline DIMM (SO-DIMM), or another memory module (for example, SIMM).

Each of the memory devices 101 to 120 may be the memory device 1000 of FIG. 2. Each of the memory devices 101 to 120 may be one of various DRAM devices such as DDR SDRAM, LPDDR SDRAM, or GDDR SGRAM. Alternatively, each of the memory devices 101 to 120 may be an SRAM device, a NAND flash memory device, a NOR flash memory device, an RRAM device, an FRAM device, a PRAM device, a TRAM device, or an MRAM device. The types of memory devices 101 to 120 may be the same or different from each other.

The number of memory devices 101 to 120 included in the memory modules 100A and 100B is exemplary, and the number of memory devices 101 to 120 may be determined depending on the memory capacity provided to the user and the capacity of each of the memory devices 101 to 120.

According to an example embodiment, as illustrated in FIG. 11, the plurality of memory devices 101 to 120 may share transmission paths for a clock CK, a command CMD, and an address signal ADDR, but may not share a transmission path for a data signal DQ and a data strobe signal DQS. For example, each of the plurality of memory devices 101 to 120 may independently receive the data signals DQ and the data strobe signal DQS from the memory controller 200. Accordingly, the memory controller 200 may independently set operating modes of each of the plurality of memory devices 101 to 120.

In an example embodiment, the register clock driver 150 may receive the clock CK, the command CMD, and the address ADDR from the memory controller 200. The register clock driver 150 may act as a buffer for the clock CK, the command CMD, and the address ADDR.

According to an example embodiment, the plurality of memory devices 101 to 120 may share transmission paths for a clock CK, a command CMD, an address signal ADDR, a data signal DQ, and a data strobe signal DQS, as illustrated in FIG. 12.

In an example embodiment, the register clock driver 150 may receive the clock CK, the command CMD, the address ADDR, the data signal DQ, and the data strobe signal DQS from the memory controller 200 (see FIGS. 1A to 1D). The register clock driver 150 may control the memory devices 101 to 120 based on the clock CK, the command CMD, the address ADDR, the data signal DQ, and the data strobe signal DQS. The register clock driver 150 may act as a buffer for the clock CK, the command CMD, the address ADDR, data signal DQ, and the data strobe signal DQS.

According to an example embodiment, the memory module 100C may not include a register clock driver, as illustrated in FIG. 13. In an example embodiment, each of the plurality of memory devices 101 to 120 may directly receive the clock CK, the command CMD, the address signal ADDR, the data signal DQ, and the data strobe signal DQS from the memory controller 200. The plurality of memory devices 101 to 120 may share transmission paths for the clock CK, the command CMD, and the address signal ADDR, but may not share a transmission paths for the data signal DQ and the data strobe signal DQS.

According to an embodiment, as will be described below with reference FIG. 14, the memory module may also communicate with the memory controller 200 through different sub-channels.

Figure 14:
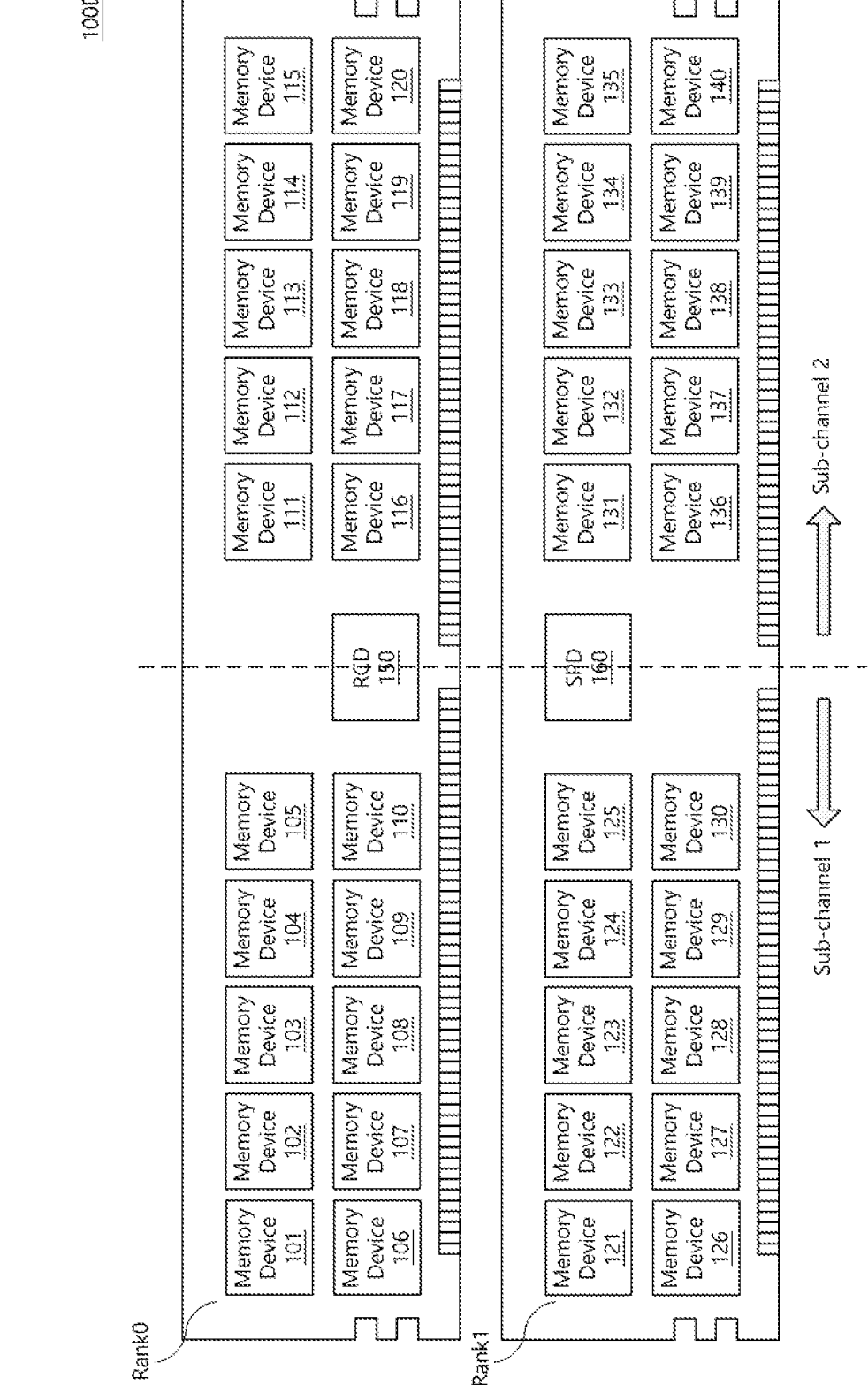
FIGS. 14 to 16 are diagrams illustrating an example in which a unique ID of a memory device according to an example embodiment is permanently stored in an ID storage region.
Figure 15:
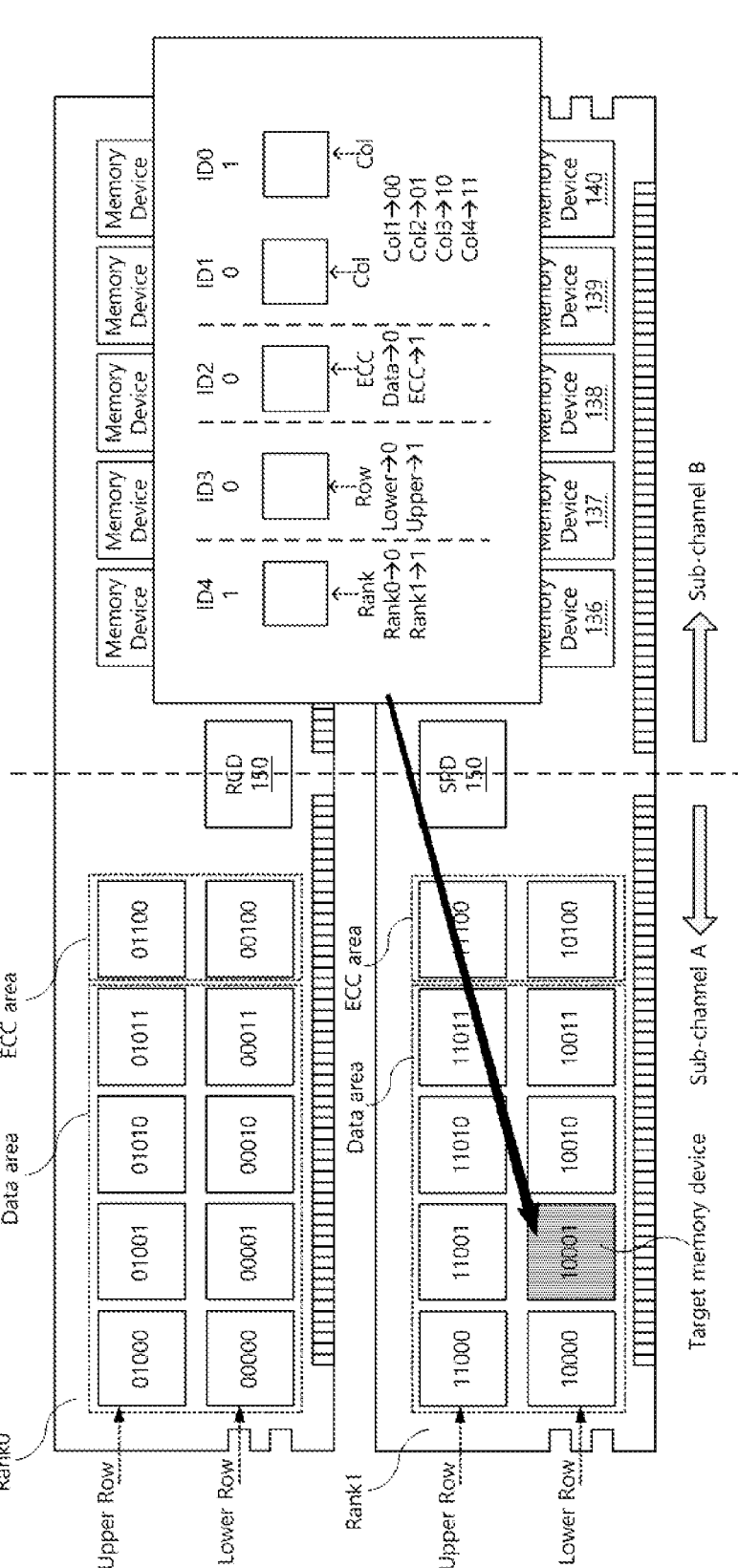
Figure 16:
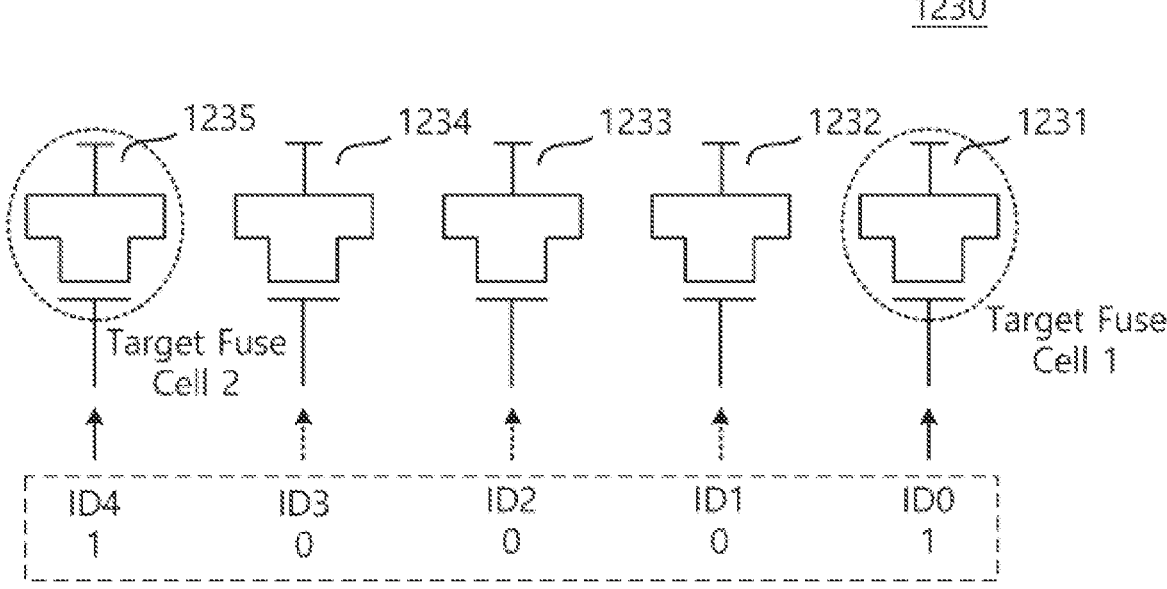

FIGS. 14 to 16 are diagrams illustrating an example in which a unique ID of a memory device according to an example embodiment is permanently stored in an ID storage region. FIG. 14 is a diagram illustrating an example of a memory module 100D according to an example embodiment, FIG. 15 is a diagram illustrating an example in which a unique ID is assigned to each memory device through PDA mode, and FIG. 16 is a diagram illustrating an example in which a unique ID is programmed in antifuse cells of a target memory device.

An example will be provided in which a memory module communicates with a memory controller through two different sub-channels. In addition, an example will be provided in which a memory device 127 is a target memory device and a unique ID of the target memory device is '10001.'

Referring to FIG. 14, the memory module 100D may include a plurality of memory devices 101 to 140 disposed on opposite sides. The plurality of memory devices 101 to 120 disposed on a first side of the memory module 100D may be disposed to the left and right with respect to a register clock driver 150. The plurality of memory devices 121 to 140 disposed on a second side of the memory module 100D may be disposed to the left and right with respect to an SPD 160.

The memory devices 101 to 110, 121 to 130 disposed on the left side of the memory module 100D may communicate with the memory controller 200 (see FIGS. 1A to 1D) through a first sub-channel Sub_Channel 1. The memory devices 111 to 120 and 131 to 140 disposed on the right side of the memory module 100D may communicate with the memory controller 200 (see FIGS. 1A to 1D) through a second sub-channel Sub_Channel 2.

Referring to FIG. 15, unique IDs may be assigned to the memory devices 101 to 110 and 121 to 130, disposed on the left side of the memory module 100D, through PDA mode. A unique ID of each memory device may be temporarily stored in a mode register of a corresponding memory device. For example, as illustrated in FIG. 15, the unique ID of the target memory device is '10001,' and the unique ID may be temporarily stored in a mode register of a target memory device.

In an example embodiment, a fourth bit value ID4 of the unique ID may correspond to rank information of the memory module 100D. For example, when the fourth bit value ID4 of the unique ID is '0,' the target memory device may be disposed in a 0th rank 0. When the fourth bit value ID4 of the unique ID is '1,' the target memory device may be disposed in the first rank Rank 1.

In an example embodiment, a third bit value ID3 of the unique ID may correspond to row information of the memory module 100D. For example, when the third bit value ID3 of the unique ID is '0,' the target memory device may be disposed in a lower row. When the third bit value ID3 of the unique ID is '1,' the target memory device may be disposed in an upper row.

In an example embodiment, a second bit value ID2 of the unique ID may correspond to ECC area information of the memory module 100D. For example, when the second bit value ID2 of the unique ID is '0,' the target memory device may be disposed in a data area. When the second bit value ID2 of the unique ID is '1,' the target memory device may be disposed in an ECC area.

In an example embodiment, the first and 0th bit values ID1 and ID0 of the unique ID may correspond to the column information of the memory module 100D. For example, when the first and 0th bit values ID1 and ID0 of the unique ID are '00,' the target memory device may be disposed in a first column on the left Col1. When the first and zeroth bit values ID1 and ID0 of the unique ID are '01,' the target memory device may be disposed in a second column on the left Col2. When he first and 0th bit values ID1 and ID0 of the unique ID are '10,' the target memory device may be disposed in a third column on the left Col3. When the first and 0th bit values ID1 and ID0 of the unique ID are '11,' the target memory device may be disposed in a fourth column on the left Col4.

In such a manner, the unique ID of the target memory device 127 may be assigned as '10001' through PDA mode, and the unique ID may be temporarily stored in a mode register of a target memory device 127.

Referring to FIG. 16, an ID storage region 1230 of the target memory device 127 may include a plurality of fuse cells 1231 to 1235. Each of the plurality of fuse cells 1231 to 1235 may correspond to the 0th to 4th bit values ID0 to ID4 of the unique ID.

In an example embodiment, among the bit values of the unique ID, only the value of '1' may be programmed in a fuse cell. For example, the bit values of the unique ID of the target memory device may each be assigned to a plurality of fuse cells, respectively. In addition, unprogrammed fuse cells may represent the value of '0' among the bit values of the unique ID, and programmed fuse cells may represent the value of '1' among the bit values of the unique ID. For example, when the unique ID of the target memory device 127 is assigned as '10001' through PDA mode, the fuse cell 1231 corresponding to the 0th bit value ID0 of the unique ID '10001' may be selected as a first target fuse cell, and a program operation may be performed on the first target fuse cell. Then, a fuse cell 1235 corresponding to a fourth bit value ID4 of the unique ID may be selected as a second target fuse cell, and a program operation may be performed on the second target fuse cell. For example, the fuse cells 1231 and 1235 corresponding to the 0th and fourth bit values ID0 and ID4 of the unique ID may be simultaneously selected as first and second target fuse cells, and program operations may be simultaneously performed on the first and second target fuse cells.

As described above, a unique ID may be assigned to each memory device through PDA mode, and the unique ID of each memory device may be permanently stored in the ID storage region through TMRS mode.

Figure 17:
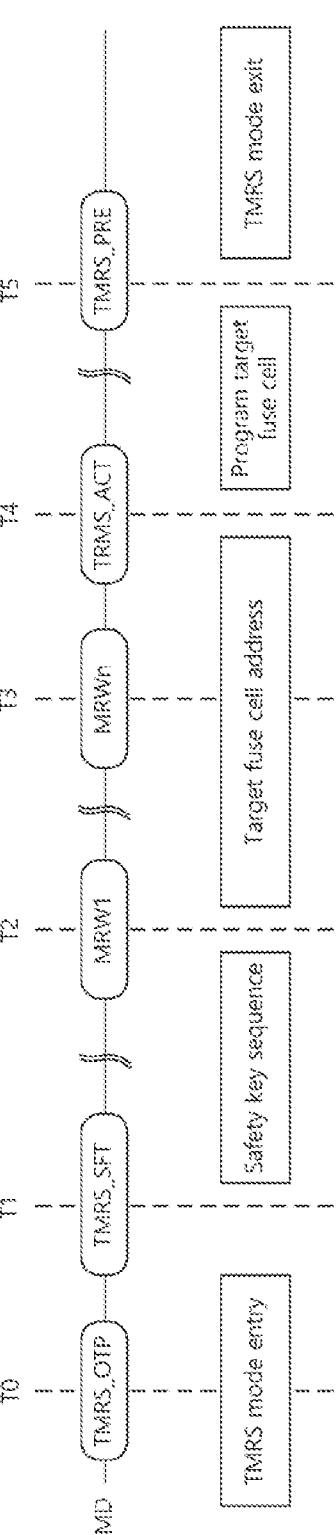

FIGS. 17, 18, 19A, and 19B are diagrams illustrating a program operation on a target fuse cell according to an example embodiment. FIG. 17 is a timing diagram illustrating an example of a program operation on a target fuse cell in TMRS mode, FIG. 18 is a diagram illustrating an example of a security key in TMRS mode, and FIGS. 19A and 19B are diagrams illustrating an example of representing address information of a target fuse cell using a mode register write command.

For ease of description, an example will be provided in which a memory module receives address information on a single target fuse cell from a memory controller, as illustrated in FIG. 6. In addition, an example will be provided in which the memory module receives a security key from a memory controller, as illustrated in FIG. 6.

Referring to FIG. 17, at time point T0, a TMRS_OTP command may be issued. For example, the memory controller 200 (see FIGS. 1A to 1D) may transmit the TMRS_OTP command to the memory module 100 (see FIGS. 1A to 1D). The memory module 100 may enter the TMRS mode in response to the TMRS_OTP command.

At time point T1, a TMRS_SFT command may be issued. For example, the memory controller 200 may transmit the TMRS_SFT command to the memory module 100. The memory module 100 may enter security key sequence mode in response to the TMRS_SFT command.

The TMRS_SFT command may be defined as a combination of TMRS commands having a predetermined order and/or set value, a combination of mode register commands MR, a new command, or the like. The TMRS_SFT command may be referred to as a security key or a security key sequence.

For example, as illustrated in FIG. 18, the TMRS_SFT command may include a plurality of commands TMRS_SFT1 to TMRS_SFT4, and the order and/or set values of the plurality of commands TMRS_SFT1 to TMRS_SFT4 may be predefined. For example, the TMRS_SFT1 command may have an OP[7:0] value of '11001111,' the TMRS_SFT2 command may have an OP[7:0] value of '01110011,' the TMRS_SFT3 command may have an OP[7:0] value of '10111011,' and the TMRS_SFT4 command may have an OP[7:0] value of '00111011.' In other embodiments, the set value of each command may be changed in various ways.

At time points T2 to T3, at least one mode register write command may be issued. The mode register write command may include address information of a selected target fuse cell.

For example, the memory controller 200 may transmit first to nth mode register write commands MRW1 to MRWn to the memory module 100. The memory module 100 may check address information of a target fuse cell based on the first to nth mode register write commands MRW1 to MRWn. The number of mode register write commands, transmitted from the memory controller 200 to the memory module 100, may vary depending on a size of the fuse array 1255 (see FIG. 3). For example, the larger the size of the fuse array 1255, the greater the number of mode register write commands transmitted to the memory module 100.

For example, each of the first to nth mode register write commands MRW1 to MRWn may include a chip select signal CS_n and a plurality of command/address signals CA0 to CA13, as shown in FIG. 19A. For example, each of the first to nth mode register write commands MRW1 to MRWn may include a chip select signal CS_n and 14 command/address signals CA0 to CA13.

In an example embodiment, the address information of the target fuse cell may be provided using values OP0 to OP7 of the plurality of commands/address signals CA0 to CA7, among the first to nth mode register write commands MRW1 to MRWn. For example, when the chip select signal CS_n is in a high state H, CA0 to CA7 may represent address information of the target fuse cell. However, this is just an example, and the address information of the target fuse cell may be provided in various ways according to example he embodiments. For example, when the chip select signal is in a low state L, CA0 to CA7 may be used to represent the address information of the target fuse cell.

The address information of the target fuse cell may be used by a plurality of mode register write commands MRWs. For example, the address information of the target fuse cell may be represented by a plurality of pieces of instruction information, and each of the plurality of pieces of instruction information may be represented by a single mode register write command. In an example embodiment, the plurality of pieces of instruction information representing the address information of the target fuse cell may include information such as a coordinate component, an index, a column address, a row address, or a bank address.

For example, the first to third mode register write commands MRW1, MRW2, and MRW3 may be provided to the memory module 100 to represent the address information of the target fuse cell, as shown in FIG. 19B.

For example, the first mode register write command MRW1 may include the row address information of the target fuse cell. For example, the values OP0 to OP7 of the plurality of command/address signals CA0 to CA7, included in the first mode register write command MRW1, may include the row address information of the target fuse cell.

For example, the second mode register write command MRW2 may include the column address information of the target fuse cell. For example, the values OP0 to OP7 of the plurality of command/address signals CA0 to CA7, included in the second mode register write command MRW2, may include the column address information of the target fuse cell.

For example, the third mode register write command MRW3 may include the bank address information of the target fuse cell. For example, the values OP0 to OP7 of the plurality of command/address signals CA0 to CA7, included in the third mode register write command MRW3, may include the bank address information of the target fuse cell.

Therefore, according to the present example, the address information of the target fuse cell may include a row address, a column address, and a bank address, and a fuse cell corresponding to a row address based on the first mode register write command MRW1, a column address based on the second mode register write command MRW2, and a bank address based on the third mode register write command MRW3 may be the target fuse cell.

According to example embodiments, a single mode register write command may include row address and column address information. Alternatively, information on a single row address may be provided through two mode register write commands.

Continuing to refer to FIG. 17, at time point T4, a TMRS_ACT command may be issued. For example, the memory controller 200 may transmit the TMRS_ACT command to the memory module 100. The memory module 100 may perform a program operation on the target fuse cell in response to the TMRS_ACT command.

At time point T5, a TMRS_PRE command may be issued. For example, the memory controller 200 may transmit the TMRS_PRE command to the memory module 100. The memory module 100 may terminate the TMRS mode in response to the TMRS_PRE command.

When there are other fuse cells to be programmed as described in FIG. 6, the program operation may be continuously performed on the other fuse cells in the same manner.

In such a manner, the memory may permanently store the unique ID assigned through PDA mode in the fuse cells of the ID storage region.

Figure 20:
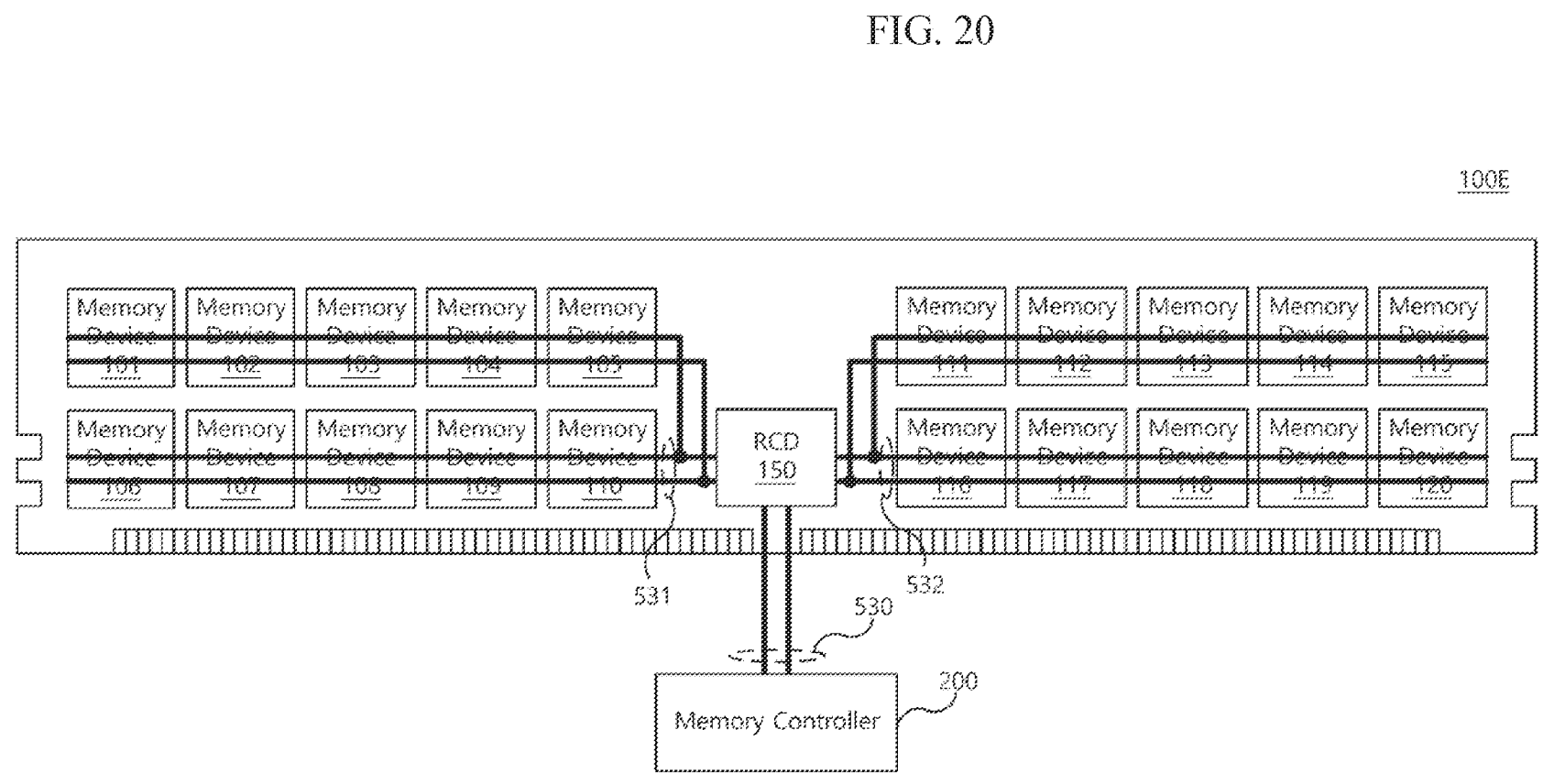

FIG. 20 is a schematic diagram illustrating an example of an OTP program recognition operation according to an example embodiment. For example, FIG. 20 illustrates an example of performing an OTP program recognition operation through a loopback operation.

Referring to FIG. 20, a memory module 100E may support loopback operation to feed back a signal or data, received from the memory controller 200, to the memory controller 200 again. The loopback operation may be an operation to immediately read back data transmitted to each of the memory devices 101 to 120. In an example embodiment, the memory controller 200 may immediately read back the data transmitted to each of the memory devices 101 to 120 without issuing a write command and a read command.

In an example embodiment, an OTP program recognition operation may be performed through the loopback operation. For example, a unique ID stored in a target memory device of the memory module 100D may be immediately read back to the memory controller 200 through the loopback operation. Accordingly, the unique ID stored in the target memory device may be rapidly checked.

In an example embodiment, a unique ID stored in each of the memory devices 101 to 120 may be transmitted to the memory controller 200 through a loopback path. The loopback path may refer to a path including a sideband bus 530.

The sideband bus 530 may correspond to a memory module management communication bus related to management of a memory module or a memory device. In an example, the sideband bus 530 may correspond to the second bus 520 in FIG. 1B and FIG. 1C.

In an example embodiment, the memory devices 101 to 110 disposed on the left side of the memory module 100E may be connected to a register clock driver 150 through a first loopback bus 531. The memory devices 111 to 120 disposed on the right side of the memory module 100D may be connected to the register clock driver 150 through a second loopback bus 532. The register clock driver 150 may be connected to the memory controller 200 through the sideband bus 530.

When a unique ID is stored in the target memory device, the unique ID stored in the ID storage region of the target memory device may be read back to the memory controller 200 through the loopback bus 531 or 532 and the sideband bus 530. In an example embodiment, the loopback bus 531 or 532 and the sideband bus 530 may be a sideband bus that is not used for a write operation or a read operation.

Figure 21:
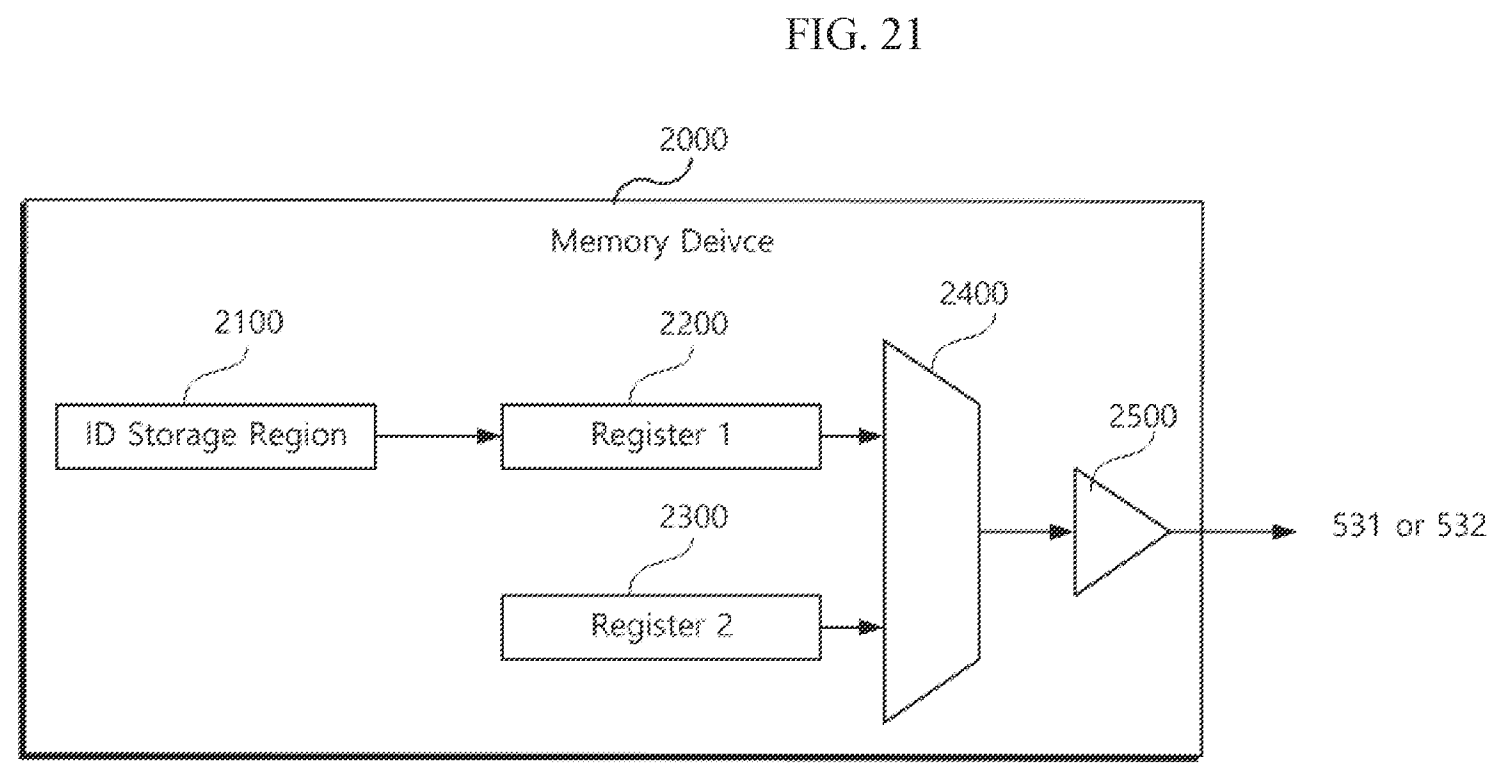

FIG. 21 is a schematic diagram illustrating an example of a memory device according to an example embodiment. A memory device 2000 of FIG. 21 may be one of the memory devices of FIG. 20.

Referring to FIG. 21, the memory device 2000 may perform an OTP program recognition operation according to an example embodiment through a loopback operation. To this end, the memory device 2000 may include an ID storage region 2100, a first register 2200, a second register 2300, a multiplexer 2400, and a driver 2500.

The ID storage region 2100 may store a unique ID of the memory device 2000 and may correspond to the ID storage region 1230 of FIG. 5. The first register 2200 may store the unique ID received from the ID storage region 2100. The second register 2300 may store loopback data LBDQ used for a general loopback operation. The loopback data LBDQ may include, for example, temperature information and telemetry information of the memory device 2000.

During an OTP program recognition operation, the multiplexer 2400 may select the unique ID stored in the first register 2200 and transmit the selected unique ID to the driver 2500. The driver 2500 may transmit the received unique ID to the loopback bus 531 or 532. Accordingly, the memory controller 200 may immediately check the unique ID stored in a target memory device through a loopback operation.

Figure 22:
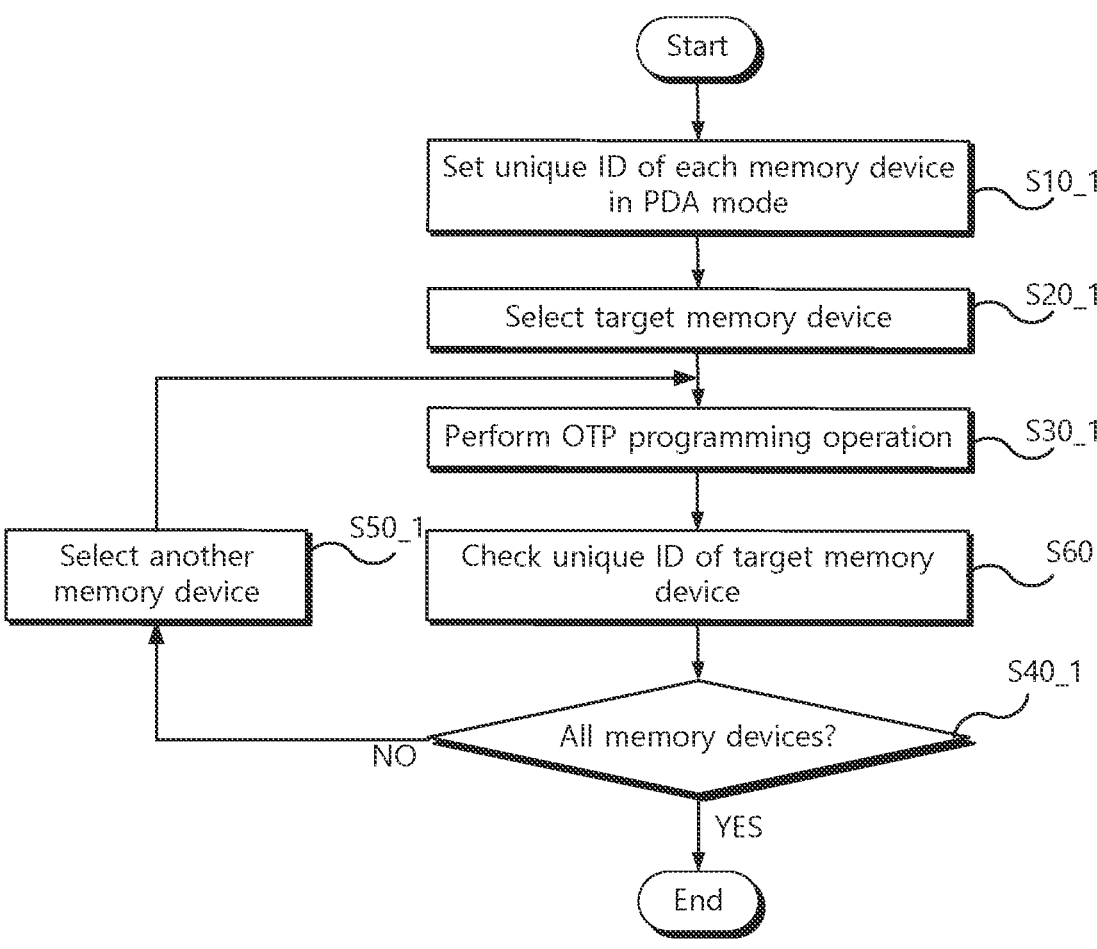
FIG. 22 is a flowchart illustrating an example of the operation of a storage device supporting an OTP program recognition operation according to an example embodiment.

FIG. 22 is a flowchart illustrating an example of the operation of a storage device supporting an OTP program recognition operation according to an example embodiment. An operation of the storage device of FIG. 22 is similar to that of the storage device of FIG. 5. Therefore, the same or similar operations are denoted by the same or similar reference numerals, and duplicate descriptions will be omitted below.

In operation S10_1, the storage device may set a unique ID for each of the plurality of memory devices (for example, see operation S10 of FIG. 5).

In operation S20_1, the storage device may select a target memory device (for example, see operation S20 of FIG. 5).

In operation S30_1, the storage device may perform an OTP program operation to permanently store the unique ID of the target memory device in the ID storage region (for example, see operation S30 of FIG. 5).

In operation S60, the storage device may check the unique ID of the target memory device. For example, the memory controller may check the unique ID programmed in the ID storage region of the target memory device through a loopback operation.

In operation S40_1, the storage device may check whether the OTP program operation has been performed on all memory devices included in the memory module (for example, see operation S40 of FIG. 5).

When there is a memory device on which the OTP program operation has not been performed, the flow proceeds to operation S50_1 in which the memory module 100 may re-select one of the memory devices, on which the OTP program operation has not been performed, as a target memory device (for example, see operation S50 of FIG. 5). In an example embodiment, the OTP program operation may be performed on the newly selected target memory device.

As described above, a memory module according to an example embodiment may temporarily store a unique ID corresponding to each of a plurality of memory devices in a mode register of a corresponding memory device and program the unique ID, temporarily stored in the mode register, in an ID storage region. Accordingly, the unique ID corresponding to each of the plurality of memory devices may be permanently stored in the ID storage region of the corresponding memory device. In addition, the memory controller may immediately check the unique ID, stored in the target memory device, through a loopback operation.

As set forth above, according to example embodiments, a storage device may permanently store a unique ID of each of a plurality of memory devices included in a memory module.

While example embodiments have been shown and described above, it will be apparent to those skilled in the art that modifications and variations could be made without departing from the scope of the present inventive concept as defined by the appended claims.

What is claimed is:

1. A method of operating a memory module configured to communicate with a memory controller, the method comprising:

temporarily storing a unique identification (ID) for each of a plurality of memory devices included in the memory module, in a mode register of each of the plurality of memory devices;

selecting a target memory device from among the plurality of memory devices; and permanently programming, in an ID storage region of the target memory device, the unique ID, which is temporarily stored in the target memory device, corresponding to the target memory device.

2. The method of claim 1, wherein the ID storage region comprises a plurality of fuse cells, and wherein the unique ID, which corresponds to the target memory device, is programmed in the plurality of fuse cells.

3. The method of claim 2, wherein the permanently programming the unique ID, which corresponds to the target memory device, in the target memory device comprises:

receiving, by the memory module, address information on a target fuse cell among the plurality of fuse cells included in the ID storage region of the target memory device; and performing a program operation on the target fuse cell.

4. The method of claim 3, wherein the receiving the address information on the target fuse cell comprises:

receiving a plurality of mode register write commands; and checking a row address, a column address, and a bank address for the target fuse cell included in the plurality of mode register write commands.

5. The method of claim 3, further comprising:

checking whether there is a fuse cell, on which the program operation is to be performed, among the plurality of fuse cells included in the ID storage region; and selecting a next target fuse cell from among the plurality of fuse cells, which are included in the ID storage region, when there is the fuse cell on which the program operation is to be performed.

6. The method of claim 3, further comprising receiving a security key from the memory controller before performing the program operation on the target fuse cell.

7. The method of claim 6, further comprising selecting a next target fuse cell from among the plurality of fuse cells included in the ID storage region of the target memory device after performing the program operation on the target fuse cell, wherein the target fuse cell and the next target fuse cell are protected by the same security key.

8. The method of claim 2, wherein the permanently programming the unique ID, which corresponds to the target memory device, in the target memory device comprises:

selecting a target fuse cell from among the plurality of fuse cells included in the ID storage region based on the unique ID temporarily stored in the mode register of the target memory device; and performing a program operation on the target fuse cell.

9. The method of claim 1, wherein the memory controller is configured to select at least two target memory devices from among the plurality of memory devices, and wherein at least two unique IDs, which respectively correspond to the selected at least two target memory devices, are permanently programmed at the same time.

10. The method of claim 1, wherein the memory controller is configured to set a temporary unique ID for each of the plurality of memory devices through a per-DRAM addressability (PDA) mode.

11. The method of claim 1, further comprising checking the unique ID, which corresponds to the target memory device, permanently programmed in the target memory device, through a loopback operation by the memory controller.

12. The method of claim 1, wherein the memory controller and the memory module are configured to communicate with each other through a sideband bus.

13. A memory module configured to communicate with a memory controller, the memory module comprising a plurality of memory devices, wherein each of the plurality of memory devices comprises:

a memory cell array comprising a plurality of memory cells;

a command decoder configured to decode a command received from the memory controller;

a mode register configured to temporarily store information on a unique identification (ID) received from the memory controller; and an ID storage region configured to store the information on the unique ID, wherein the unique ID for each of the plurality of memory devices is stored in the mode register of each of the plurality of memory devices through a per-DRAM addressability (PDA) mode, and wherein the unique ID for a target memory device, among the plurality of memory devices, which is temporarily stored in the mode register of the target memory device, is programmed in the ID storage region of the target memory device through an one-time programmable (OTP) mode.

14. The memory module of claim 13, wherein among a plurality of fuse cells included in the ID storage region of the target memory device, a target fuse cell is selected based on address information included in a plurality of mode register write commands received from the memory controller.

15. The memory module of claim 14, wherein the plurality of fuse cells included in the ID storage region of the target memory device comprise a first target fuse cell and a second target fuse cell, and wherein a first program operation on the first target fuse cell and a second program operation on the second target fuse cell are sequentially performed.

16. The memory module of claim 14, wherein the memory module is configured to transmit the information on the unique ID stored in the ID storage region of the target memory device to the memory controller through a loopback operation.

17. A storage device comprising:

a memory module;

a memory controller configured to control an operation of the memory module and configured to communicate with the memory module through a first bus; and a baseboard management controller configured to communicate with the memory module through a second bus and configured to monitor information on the memory module, wherein the memory module comprises a plurality of memory devices, wherein each of the plurality of memory devices comprises:

a memory cell array comprising a plurality of memory cells;

a command decoder configured to decode a command received from the memory controller;

a mode register configured to temporarily store information on a unique ID identification (ID) received from the memory controller; and an ID storage region configured to store the information on the unique ID, and wherein the unique ID for each of the plurality of memory devices is stored in the mode register of each of the plurality of memory devices through a per-DRAM addressability (PDA) mode, and wherein the unique ID for a target memory device, among the plurality of memory devices, which is temporarily stored in the mode register of the target memory device, is programmed in the ID storage region of the target memory device through a test mode register set (TMRS) mode.

18. The storage device of claim 17, wherein the memory controller is configured to select a target fuse cell from among a plurality of fuse cells included in the ID storage region of the target memory device, based on address information included in a plurality of mode register write commands received from the memory controller.

* * * * *